United States Patent [19]
Klinner

[11] Patent Number: 5,036,653
[45] Date of Patent: Aug. 6, 1991

[54] APPARATUS AND METHOD FOR HARVESTING CROPS

[76] Inventor: Wilfred E. Klinner, Beechwood, Heath Lane, Aspley Heath, Woburn Sands, Milton Keynes, Buckinghamshire MK17 8TN, United Kingdom

[21] Appl. No.: 381,661
[22] PCT Filed: Jan. 4, 1988
[86] PCT No.: PCT/GB88/00001
  § 371 Date: Jul. 3, 1989
  § 102(e) Date: Jul. 3, 1989
[87] PCT Pub. No.: WO88/04885
  PCT Pub. Date: Jul. 14, 1988

[30] Foreign Application Priority Data
  Jan. 5, 1987 [GB] United Kingdom ................ 8700052
  Apr. 2, 1987 [GB] United Kingdom ................ 8707822

[51] Int. Cl.$^5$ ............................................ A01D 45/30
[52] U.S. Cl. ........................................ 56/130; 460/24; 460/73; 460/121
[58] Field of Search ......... 56/130, 126, 128, DIG. 17, 56/DIG. 19; 460/24, 62, 63, 66, 67, 68, 69, 70, 71, 73, 75, 80, 81, 105, 113, 121, 122, 106, 902

[56] References Cited
U.S. PATENT DOCUMENTS

| | | | |
|---|---|---|---|
| 46,031 | 1/1865 | Sellers | 460/121 |
| 217,039 | 7/1879 | Allonas | 460/121 |
| 396,785 | 1/1889 | Wagner | 460/122 |
| 1,302,574 | 5/1919 | Mason | 460/122 |
| 1,418,542 | 6/1922 | Dill | 56/14.9 |
| 1,424,933 | 8/1922 | Owen | 460/122 |
| 2,152,730 | 4/1939 | Cory | 56/130 |
| 2,321,019 | 6/1943 | Dray | 460/71 |
| 3,664,100 | 5/1972 | Rowland-Hill | 460/121 |
| 4,146,038 | 3/1979 | DeBusscher et al. | 460/105 |
| 4,335,562 | 6/1982 | Meyers et al. | 460/105 |
| 4,338,954 | 7/1982 | Kirst et al. | 460/122 |
| 4,581,880 | 4/1986 | Klinner | 56/364 |
| 4,790,128 | 12/1988 | Klinner | 56/364 |

FOREIGN PATENT DOCUMENTS
8601972 4/1986 PCT Int'l Appl.

Primary Examiner—Terry Lee Melius
Attorney, Agent, or Firm—Collard, Roe & Galgano

[57] ABSTRACT

The apparatus for harvesting crops, particularly seed crops, comprises a mobile support structure 20 and a crop stripping device in the form of a rotor 30, which may be attached to height adjustable arms and is driven by drive means 22. The rotor 30 carries transverse rows of crop engaging elements 32 comprising loosening beaters and/or combing teeth. The drive to the rotor is so arranged that during forward movement of the apparatus the crop engaging elements 32 are propelled progressively through the crop, moving upwards at the front region. Seeds and other plant parts detached by the action of the rotor are impelled into a crop flow passage 27 under a crop guide cover 21. A transverse auger 83 transfers the detached material into a duct 84 where an elevator 85 moves it over a screen 86 for separation of the seeds. The coarse crop material is directed for further processing to recover remaining seeds.

18 Claims, 11 Drawing Sheets

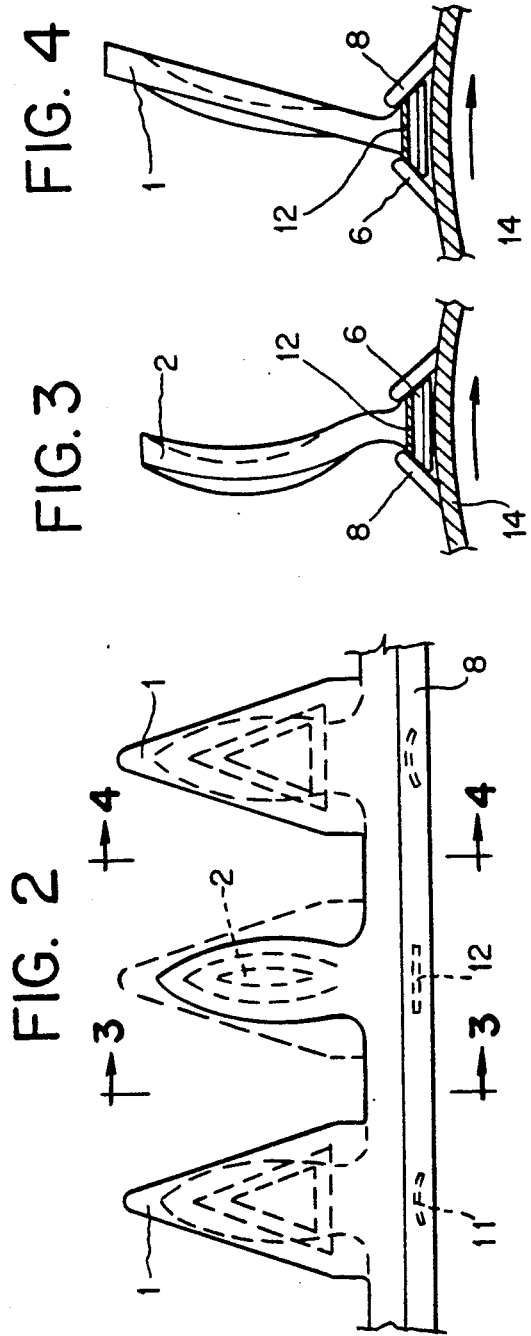

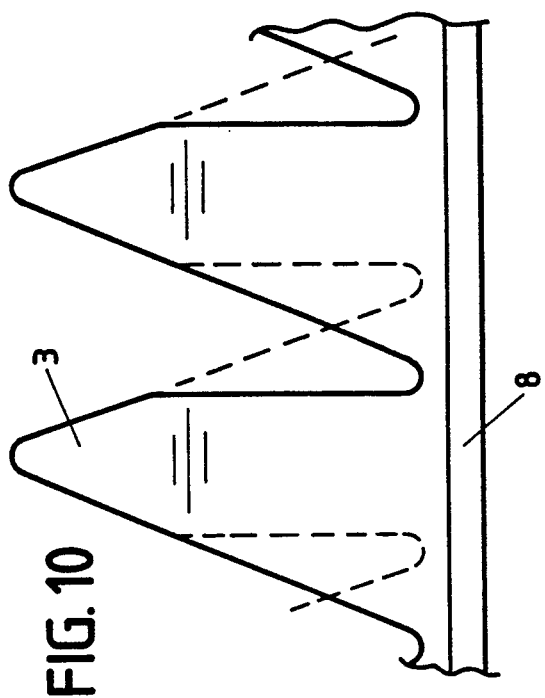
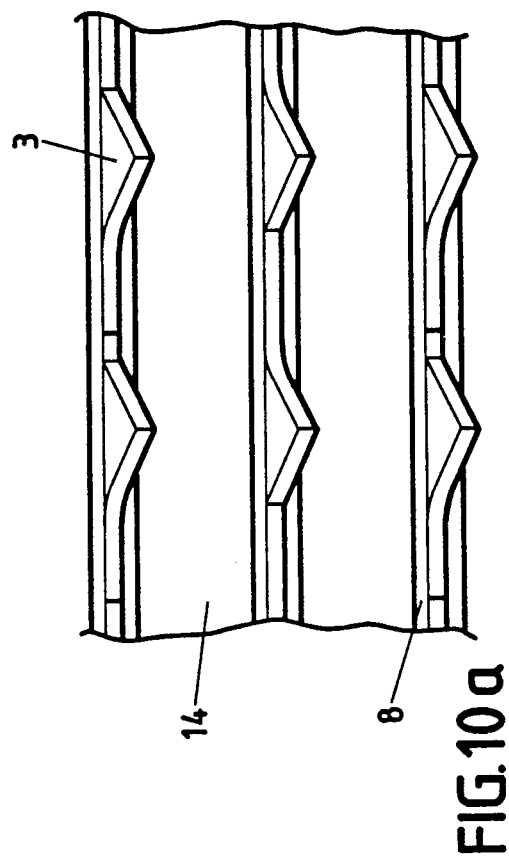
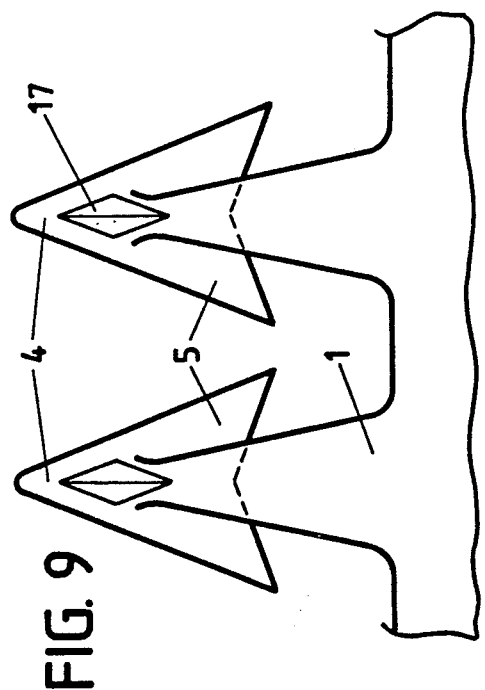
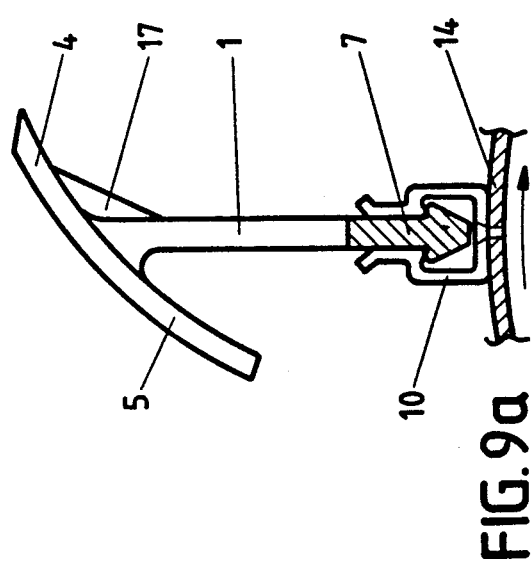

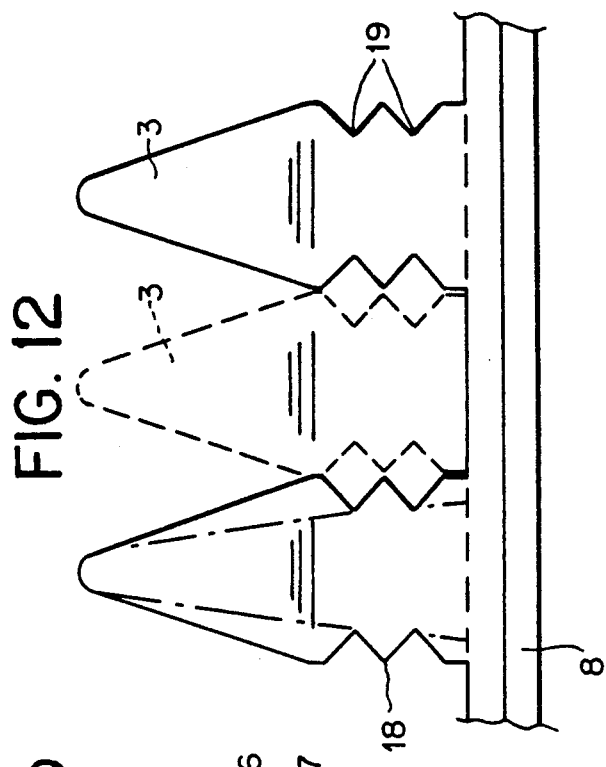
FIG. 11
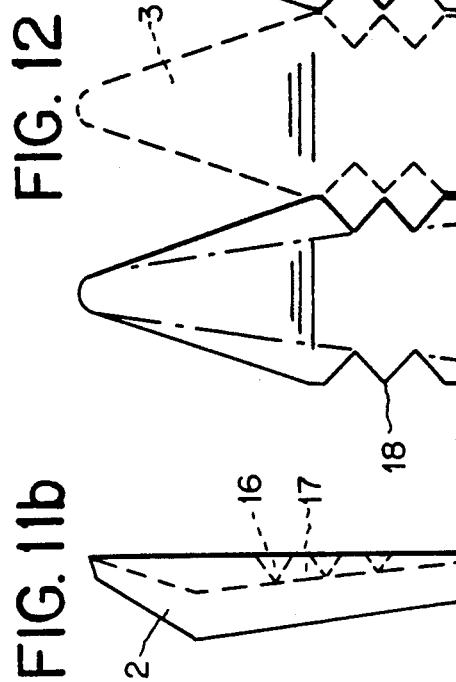
FIG. 11b
FIG. 12
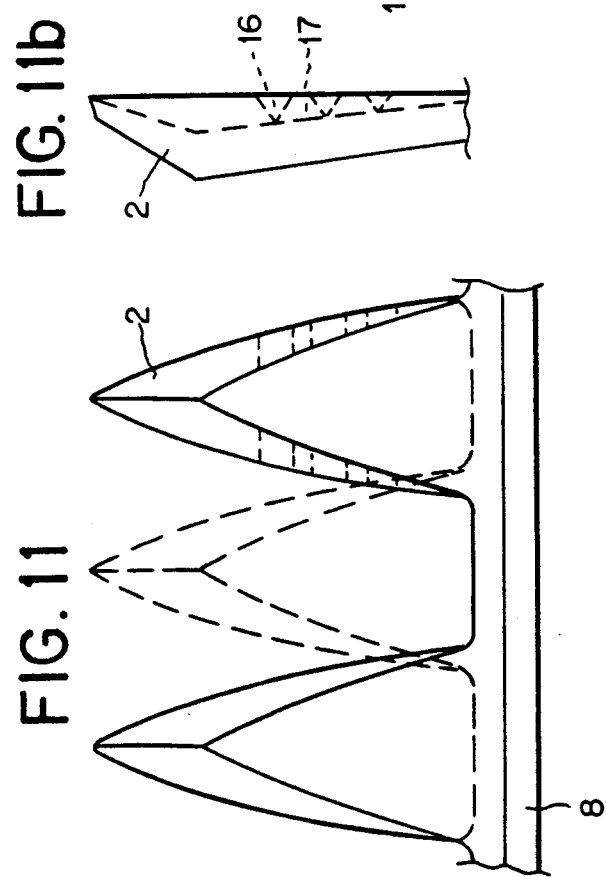
FIG. 11a
FIG. 12a

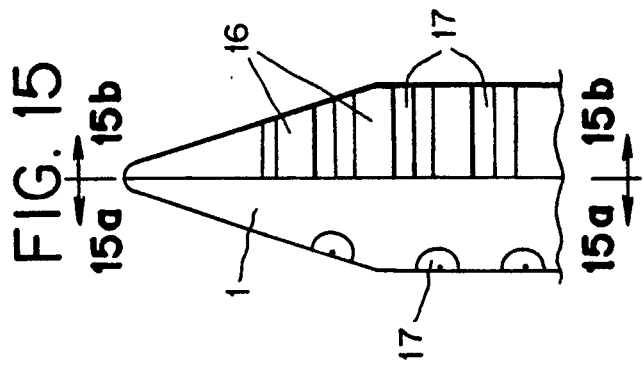
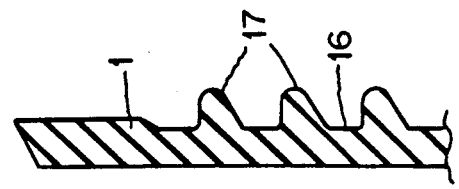
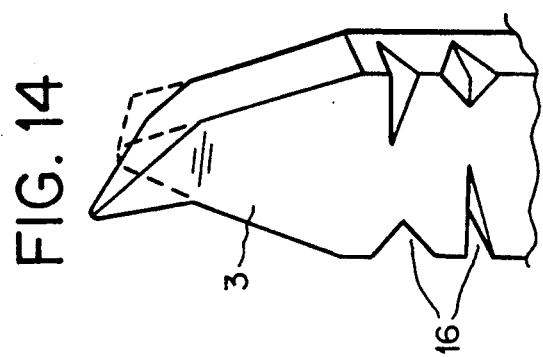
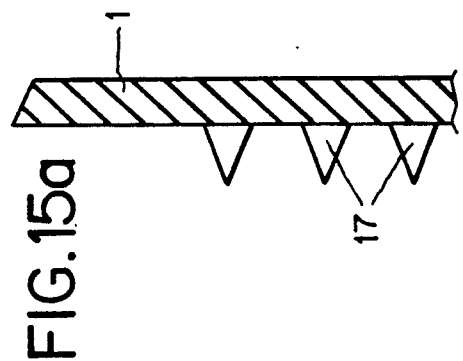
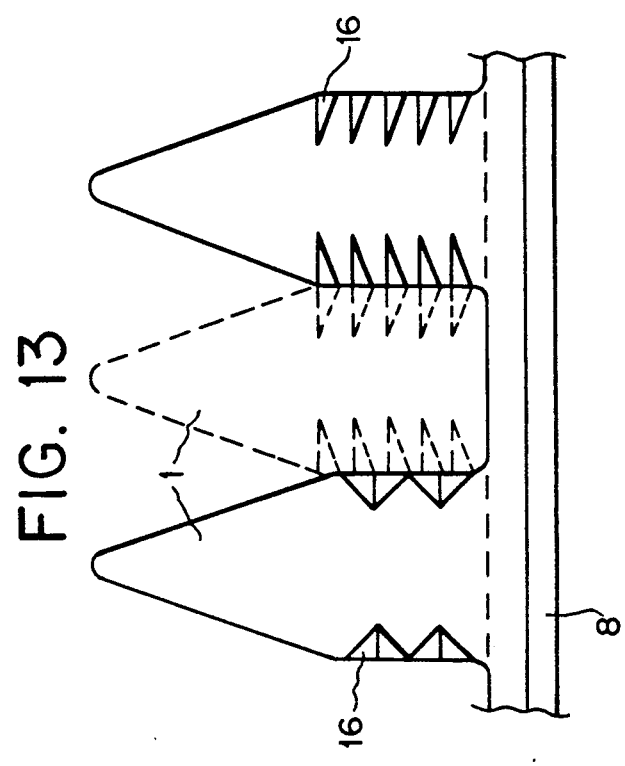
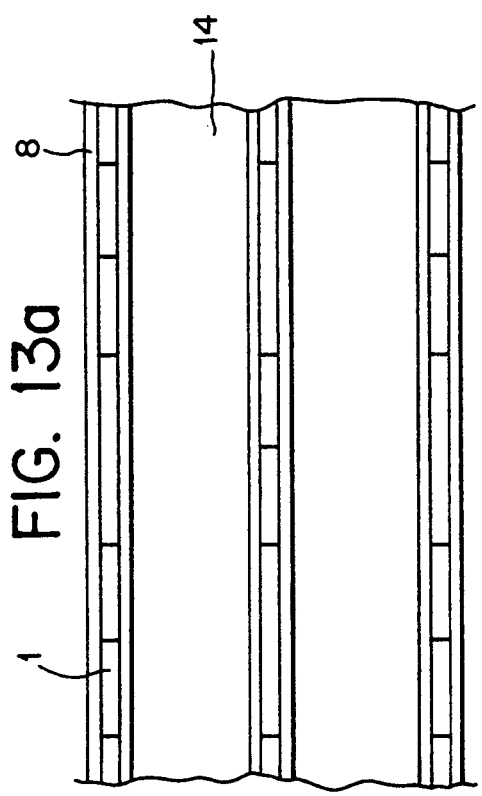

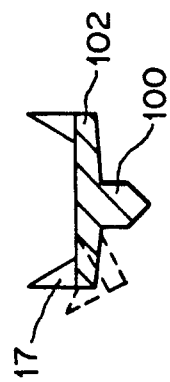
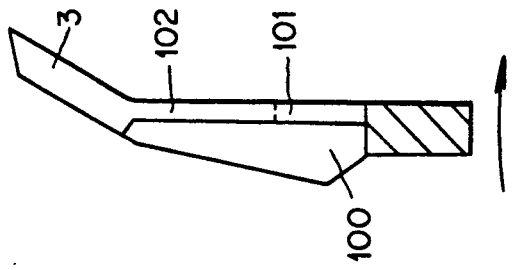
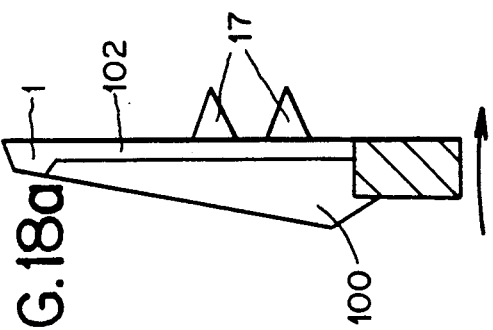
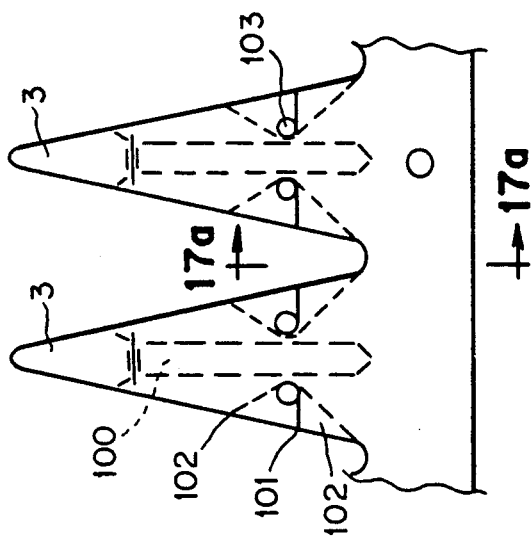
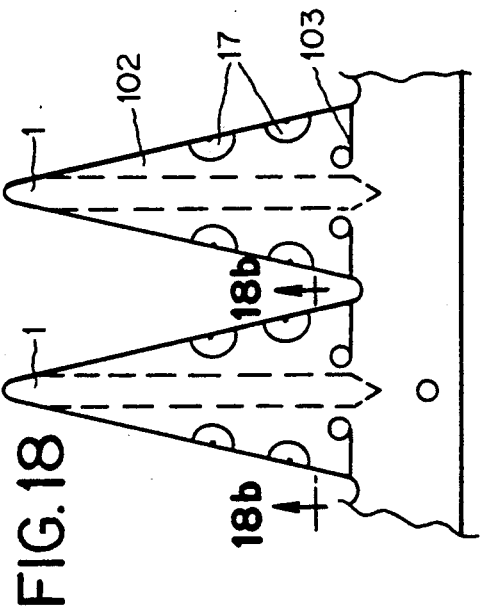
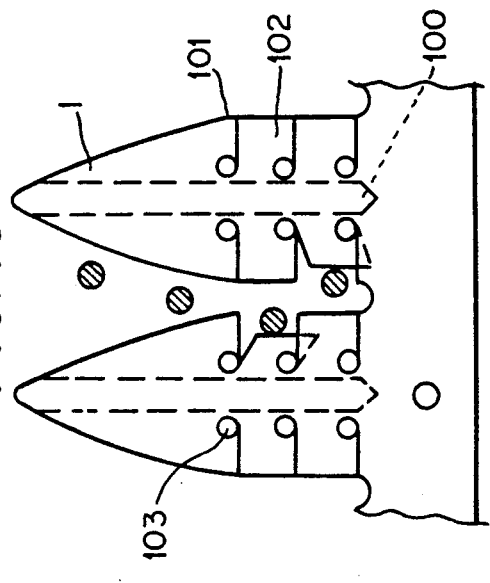

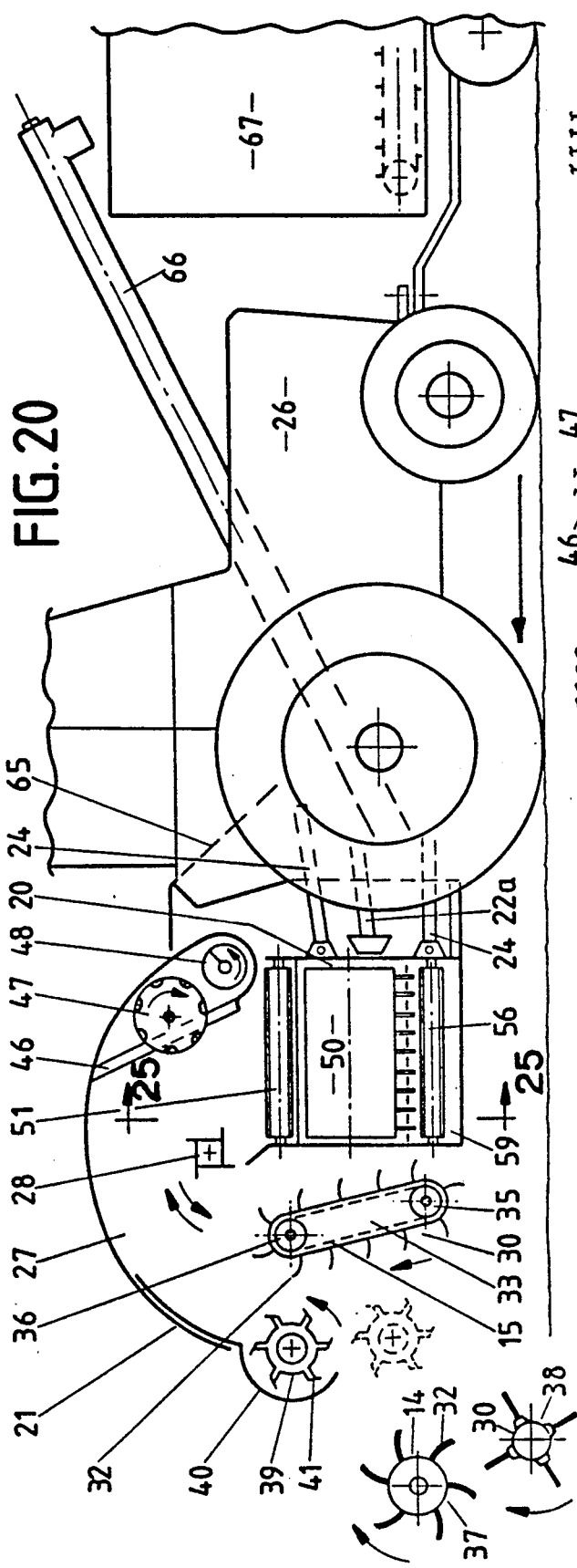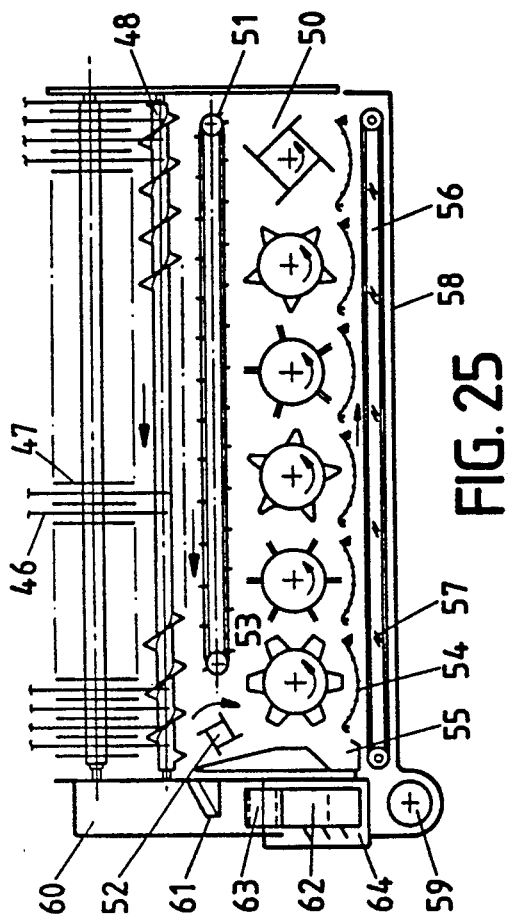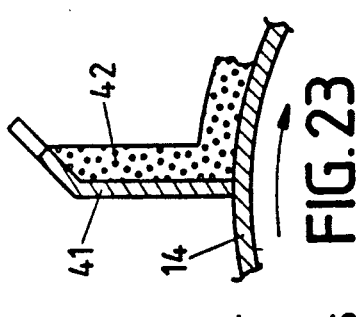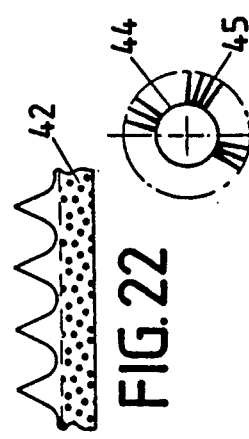

APPARATUS AND METHOD FOR HARVESTING CROPS

The present invention relates to apparatus for, and a method of, harvesting crops. It is concerned with detaching from plants, without cutting them, seeds, seed-bearing parts, seed bodies, and certain fruits and/or foliage, collecting the detached material and separating from it the wanted plant parts. The invention has particular application in the harvesting of grain crops, such as wheat, barley, oats and rice, but also has application in the harvesting of pulses, oilseeds and herbage seeds.

The invention has application also in the harvesting of nuts and other seed bodies and of flower heads, some fruiting bodies and foliage.

Commonly the harvesting of seed crops, particularly cereal and herbage seed crops, is carried out by a once-over, destructive operation which involves the cutting of the seed-bearing stems near their base. Harvesting machines, particularly combine-harvesters, are easily overloaded by large volumes of crop bulk, because these create problems of seed detachment and separation.

The in-situ stripping of seeds from the uncut crop has been attempted repeatedly and has met with varying degrees of success. In-situ seed stripping by a rotary device became known through U.S. Pat. No. 1,290,484 entitled 'Standing Grain Harvester'. However, none of the early disclosures made adequate provision for satisfactorily harvesting seeds or other wanted parts from crops which are unfavourably presented, because they are either severely leaning, tangled, twisted or laid, with the wanted parts in close proximity of the ground.

The most recent disclosures of in-situ seed stripping are by the present inventor in published pending PCT Application WO 86/01972 and in published pending UK Patent Application GB 2188822A. These relate to crop stripping apparatus using crop engaging elements which are preferably resiliently mounted or made of resilient material, so that damage is avoided if inadvertent contact is made with the ground or with foreign objects on the ground.

It is among the objects of the present invention to provide an improved apparatus for, and method of, removing wanted plant parts from an uncut crop, and to overcome many of the known disadvantages of existing harvesting machinery and methods.

More particularly, it is an object of the present invention to reduce losses of wanted plant parts, particularly seeds, which can occur in some crops and conditions with existing crop engaging elements, to keep low the energy requirement of crop stripping rotors, and to minimise the detachment of unwanted material and maximise the detachment of individual seeds, as opposed to whole or part seed heads, or of other wanted parts, so that any subsequent task of separating and cleaning the wanted fraction is facilitated and the required mechanisms can be kept small and simple.

According to one aspect of the present invention there is provided apparatus for harvesting crop comprising: a mobile support structure for movement over the ground; moveable support means capable of being driven relative to the support structure and extending transversely across the direction of forward movement of the apparatus; transverse arrays of crop engaging elements, each cantilevered outwardly from the moveable support means; means for driving the moveable support means so that the crop engaging elements comb through the unsupported crop at a front region, to detach wanted plant parts from the uncut crop and to impel them into recovery trajectories; a crop guide cover extending over the apparatus to prevent detached crop particles becoming lost and to direct them rearwards for collection; characterised in that the crop engaging elements are elongate elements with symmetrical outer regions, each having a narrow tip, the tips of elements in succesive transverse arrays following, in operation of the apparatus, in laterally equally spaced paths parallel with their direction of movement, the inner region of each element having side regions at least one of which is fashioned to form a differently inclined and/or uneven continuation of the outer side region.

According to another aspect of the invention, there is provided a method of harvesting a crop comprising: moving through the uncut crop a harvesting apparatus; moving at a front region of the apparatus a plurality of elongate crop engaging elements having narrow tips and being outwardly cantilevered from moveable support means; engaging the uncut crop with the moving elements; dividing the crop and detaching from it wanted parts by high-speed impacts, by rubbing, and by induced bending, shaking and whiplash; and impelling and conveying the detached crop parts into the apparatus for collection or further processing.

The apparatus of the invention operates by detaching from the seed-, flower- or fruit-bearing stems of plants the wanted parts by combing through the crop, leaving the stems standing.

The apparatus preferably also comprises associated compact apparatus for separating already threshed seeds from the wanted and unwanted material detached by combing, and for completing the detachment and separation of seeds from whole or part seed-bearing heads broken off and collected during the combing process.

The form of the crop engaging elements has been found to have beneficial effect upon the effective operation of preferred embodiments of the invention. The size and shape of the elements, together with their operating angles and lateral and circumferential spacings, can be selected to maximise the desired effects in terms of seed detachment and recovery during the combing process.

As plant stems are stroked by the sides of fast moving crop engaging elements, the stems are deflected more readily laterally than the relatively heavy seed-bearing heads. Because of their inertia, the seed heads adjacent to elements are subjected to a whiplash effect. This causes seeds to be shed, particularly when seed heads collide with the surface of the elements or with each other. Sometimes all or part of a head still containing seeds can break off.

Individual seeds which become detached on, or collide with, crop engaging elements bounce off and, in operation of known harvesters, are often launched into unfavourable trajectories for recovery.

In accordance with one preferred feature, in embodiments of the invention, the outwardly projecting crop combing teeth are moulded from resilient material and are smoothly shaped to minimise any crop tearing effect. These teeth are preferably flat near their roots for predictable yielding in that region if an impact with the ground or with a heavy foreign body should occur.

In accordance with another preferred feature the crop engaging elements have crop engaging surfaces which lie in two or more planes along their length between the base region and the tips of the elements. More preferably, the crop engaging surfaces of the elements lie in two or more planes along the length of the elements and at the same time lie in two or more planes transversely between the lateral boundaries of the elements.

At least some of the crop engaging elements may have cupped depressions away from the side edges in their crop facing surfaces in order to produce momentary scooping of crop particles detached by the elements or by adjacent or preceding elements. Preferably before or immediately after the elements carried on the moveable support means pass the top-dead-centre position of their tip path, the particles are released by centrifugal effect from the depressions and are launched into recovery trajectories.

The edges surrounding the central depressions in the combing elements, or teeth, are more effective in detaching seeds from stems than the edges of flat elements.

Preferably there are different shapes of crop combing teeth. Preferably two different shapes alternate transversely and circumferentially and are formed to project outwards at different angles from the moveable support means. This is to accommodate more readily crops of different stem thickness and to minimise crowding of stems into the recesses between adjacent combing teeth and tearing off of non-seed parts.

Preferable shapes of cupped combing teeth are triangles with optional near-parallel sides in the base region and oval teeth resembling a spoon head.

Preferably the reclined angle a cupped combing tooth makes at the inside edge near the tip with the extended radius of moveable support means is 20° or less. Cupped combing teeth of different shape may also have different lengths. Cupped triangular and oval teeth may be used in conjunction with flat triangular teeth.

It has been found advantageous to utilise reclined seed loosening beater-type elements which may be evenly dispersed among crop combing teeth, preferably in proportions of 1 in 4 to 1 in 8. Thus, seed loosening beaters are normally surrounded by longer, more outwardly projecting combing teeth which pick up and impel upwards any seeds released by the stroking/beating action imparted to the crop by laterally projecting arms or wings of the beaters.

In preferred form seed loosening beaters may resemble reclined V-shaped forks. The laterally extending arms may additionally extend either outwards or inwards and may be so dimensioned and angled that their trailing ends project into the spaces between circumferential rows of combing teeth. The arms may be circular or multi-sided in cross-section, with their resistance to deflection in any direction determined by their thickness and the resilience of the material from which they are made. The lateral extension of the arms may vary and include at least half the lateral spacing between circumferential rows of combing teeth, so that in operation of the apparatus the arms of laterally adjacent seed loosening beaters form an enclosure between the base and tip regions of the combing teeth.

It is preferred that crop loosening beaters are used in combination with flat and/or cupped combing teeth.

In an alternative form of construction, a seed loosening beater with laterally extending trailing wings may form the leading portion of a combined element whose inner flat or concave crop facing surface is well adapted to impelling detached crop parts for recovery. Preferably the tip region of the leading seed loosening portion is forwardly inclined and the wings are trailing relative to the direction of rotation of the support means. Such combined crop engaging elements may be used exclusively or in conjunction with other forms of element.

In accordance with another preferred feature the crop combing elements may be provided, particularly along the edge regions of their crop engaging surfaces, with spaced-apart, notch-shaped or other forms of recesses, or with intermittent protrusions, or a combination of recesses and protrusions, preferably in such a way that they do not affect the solid profile of the elements in operation, yet provide the action of a comb as the plant stems are drawn over the peripheral regions during rotation of the support means, following deflection of the stems by the whiplash effect.

As a further aid to effective stripping of wanted plant parts, the crop engaging elements may have side regions made of thinner or more flexible material than the outwardly extending central region, to allow preferential yielding of the side regions in response to increasing crop pressure and friction.

Preferably the flexible side regions are divided by lateral slits, so that each section may yield independently, allowing momentary intrusion of stiff plant stems into the normal profile of the elements.

As a further refinement the flexible side regions may be provided near their edges with protrusions which, on deflection of the side regions, intrude into the laterally adjacent spaces between elements beyond the normal profile of the elements.

In some embodiments the flexible side regions may be made of impact and abrasion resistant material which is so flexible that only in operation are the elements maintained fully in their operative position, to detach wanted plant parts by a flailing effect.

It is generally preferred that the outer regions of crop engaging elements are symmetrical and that in operation successive tips follow each other in laterally equally spaced paths parallel to their direction of movement. The inner regions of laterally adjacent and circumferentially spaced crop engaging elements may have side regions which, in operation, abut or overlap, or the side regions may be fashioned to be uneven in shape and/or surface characteristics.

Embodiments of the present invention preferably incorporate certain novel and improved mounting arrangements for the crop engaging elements. Accordingly, the crop combing teeth and the seed loosening beaters may be formed, preferably by moulding, individually or in continuous strips, with the base portions thickened in stepped form or by gradual tapering towards the inner end. Corresponding guides, which may be welded, screwed, bolted or otherwise secured generally transversely to the preferably tubular central member of the moveable support means, enable such elements to be slid laterally into their operating positions and to be retained there securely.

Optionally there may be embedded in the shaped base section of the elements thin separate strips of metal or other strong material, or a continuous strip, of width substantially greater than the outer gap between pairs of guides but narrower than the clearance between guides at the level of the inserts near the base of the elements. Particularly when the crop engaging elements are made of soft resilient material and an easy sliding fit is desired, the inserts serve to prevent the elements from springing out of the guides as a result of atypically high tip loads.

To prevent chafing of the elements, the upper edges of the guides may be rounded, curved outwards or protected by a covering.

To facilitate replacement of damaged elements, the guides on the moveable support means may be discontinuous, with chamfered joins along their length, preferably every meter. Preferably the core member of the moveable support means may be circular or polygonal in cross-section. If the moveable support means consists of a continuous belt or flexible sheet, as is desirable in some embodiments of the invention, the guides for the crop engaging elements may be provided conveniently by suitably moulded slats.

In operation of a preferred embodiment of the invention the moveable support means supporting generally transverse arrays of crop combing teeth with optionally interspersed seed loosening beaters, and which moveable support means is preferably adjustable in height, is driven to move the crop engaging elements upwards through the crop to remove by stripping seeds and other wanted parts from the plants, and to impel the removed parts upwards towards the preferably smoothly curved crop guide cover which directs them rearwards to the following part of the apparatus for further processing and collection.

The height-adjustable moveable support means may comprise a horizontal rotor mounted in the mobile support structure substantially transversely to the path of forward movement of the apparatus, the rotor being provided with at least two transverse arrays of said crop engaging elements.

An alternative to the height-adjustable, driven moveable support means may comprise a continuous belt or flexible sheet which extends across the full working width of the apparatus, generally transversely to its path of forward movement and vertically or forwardly inclined at the upper end. The full-width belt or other means may be supported, under sufficient tension to transmit the required driving force, between two rollers or sets of sprockets or wheels. Preferably there may be secured to the driven side of the flexible support means teeth or toothed belts at least near both sides, to register with toothed wheels or pulleys at least on one of the shafts which provides the drive.

Advantageously there may be provided an additional high-speed front rotor co-operating with the principal stripping device. Thus there may be provided a preferably separately height-adjustable rotor facing the principal stripping device and rotating in the lower centre region against the direction of forward movement of the harvesting apparatus. Around most of its front portion the additional rotor may be shielded by a hood against premature contact with the crop. The additional rotor is driven at peripheral speeds suitable for stripping wanted plant parts from the forward facing regions particularly of seed heads, to re-direct into recovery trajectories seeds which are propelled against it by the principal stripping device, and to assist feeding of the crop into the principal stripping device, especially when the crop is tangled or lodged.

In a preferred embodiment incorporating such an additional rotor, the outer portion of transverse ribs of the additional rotor may be bent forward in the direction of rotation and scalloped, to enhance its crop stripping function. Optionally the inner surfaces of the transverse ribs and the core sections between ribs may be covered in soft, impact-absorbing and wear-resistant resilient material, like polyurethane foam sheeting.

In an alternative embodiment the additional rotor may be densely studded on its core surface with tough but relatively soft protrusions which may taper towards their tips and may be circular or oblong in cross-section. The protrusions serve to remove seeds from the forward facing plant parts and to lift crop by a flailing action. Any particles which may be thrown against the rotor are particularly likely to be re-directed upwards. In known manner an adjustment may be provided for the position of the hood which covers the additional rotor at the front, to advance or retard the exposure of crop to the action of the rotor.

For specific crops and purposes a wide range of crop engaging elements may be provided on the additional rotor preceding the principal stripping device, including elements with reclined tip regions.

Whilst the crop guide cover over the principal stripping part of the apparatus preferably continues rearwards, to prevent detached crop parts from being lost and direct them for further processing into a second part of the apparatus, there may be provided under the crop guide cover additional means, for example upwardly inclined flexible belt conveyors, having axes of rotation parallel with those of the stripping device. The additional means may be so positioned that they assist in the recovery of crop particles from the stripping device, re-direct and accelerate or retard stripped material, or help to convey it to a higher level for further processing.

In embodiment of the invention there may be combined, with the crop stripping device, preferably transversely oriented apparatus for separating wanted from unwanted crop fractions and for cleaning the wanted fraction. Accordingly there may be provided transversely arranged compact means for separating the free seeds already threshed by the stripping device, re-threshing any crop portions still containing seeds, separating the further detached seed and optionally applying primary cleaning to the separated seed before conveying it for final cleaning and collection.

In preferred embodiments, the crop guide cover defines with the seed stripping and separating apparatus a crop flow passage through which stripped material reaches the separating section. Near the end of the crop flow passage there may be provided a transverse array of thin spaced-apart driven discs on a common shaft, optionally intermeshing with thin, static, spaced-apart, forward-facing fins bridging in the vertical plane the space between the crop guide cover at the top and a transverse conveyor, preferably an auger conveyor, for separated seeds and other small crop particles to fall into.

Yet a further or alternative means of separating small from coarse detached material may be provided by a transversely and generally horizontally arranged open-mesh conveyor made of pivoted metal links or flexible mesh material. Preferably the screen apertures are so dimensioned that seeds can pass through the upper and lower runs of the conveyor, which move in opposite directions, to be transported sideways by transverse scraper slats attached to the conveyor and co-operating with a floor plate. Thus, coarse material is conveyed in one direction on the upper level and wanted plant parts, particularly seeds, with small impurities in the opposite direction at the lower level.

To enhance the effectiveness of the open-mesh conveyor, there may be provided above it a previously described transversely arranged array of spaced-apart separating fins for deflecting the coarse material away from one side of the conveyor, and guide means for directing seeds and small fragments onto the clear side of the conveyor. Further improvement of the separating effectiveness of the open-mesh conveyor may be provided by agitating means fitted beneath the upper conveyor run so that this is lifted and lowered abruptly at short intervals.

The agitating means may consist of two or more shafts arranged transversely to the direction of conveyor movement, each shaft carrying at least one set of lobes or eccentric rollers, and the two or more shafts are kept in synchronisation, as required, by a chain joining equal-sized sprockets at the ends of the shafts.

Beneath the open-mesh conveyor there may be positioned threshing means for detaching and separating from the coarse material any unthreshed seeds. Conveniently the threshing means may comprise one threshing and one beating drum or a succession of such drums arranged and driven generally with their axes in the horizontal plane and oriented in the direction of forward movement of the apparatus.

The threshing and beating drums may co-rotate to move the crop beneath them from the feed end to the discharge end. As an alternative to feeding from above, the stripped material may be directed to the feed end from a lower level for threshing, for example from a transversely acting, side- or centre-delivering table auger of known configuration.

Beneath each drum there may be provided an open-gate concave generally of known construction for separating out the detached seeds. In accordance with common practice the clearance between each concave and drum is adjustable to vary the severity of treatment.

To protect the multi-drum tangential threshing means against damage by foreign objects entrained in the crop, a stone trap is preferably provided in front of and beneath the entrance to the primary threshing unit. In addition, each concave may be pivoted at the upstream end and supported resiliently, preferably on elastic springs, at the exit end. Depending on the crops to be threshed, the threshing drums may be provided with conventional rasp bars or with studs or pegs which give a more severe action.

As an alternative to individual concaves being provided under each threshing or beater drum, all the concaves may be mounted on a common support structure with adjustment being provided to lift or lower the front and/or rear on either or both sides.

Because harvesting seed by in-situ stripping can reduce the straw intake by around 50%–90%, the re-threshing means may be dimensioned more modestly than in a conventional combine-harvester. Where high throughput is essential, the fore-and-aft length of the threshing and beating drums may be increased. Alternatively, the multiple-drum re-threshing means may be replaced by an axial threshing rotor with cylindrical concave surrounding it.

In known forms of such axial threshing means the crop is fed usually to a helical intake impeller axially or from a tangential direction, always at a low level, and not from the rear or above, as in the present invention.

In the axial threshing unit the crop is treated in a spiral path guided by suitably angled threshing bars on the rotor and/or by helically arranged deflectors on the inner surface of the cylindrical open-grate concave. The threshing region is adjacent the feed region and is followed by the separating and discharge regions.

Beneath the threshing means, whether tangential or axial, there may be provided an open-mesh transverse conveyor for separating out seeds from any coarse material which may have passed through the threshing concaves, the coarse material being conveyed at the upper level in one direction, conveniently for discharge on to the field surface, and the seeds being conveyed in the opposite direction at the lower level for transfer into another, preferably rearwardly directed conveyor.

The open-mesh conveyor may be agitated by eccentric means under the upper run, to encourage seeds to pass through. Additionally there may be provided transverse slats, to make conveying over a solid base plate positive and increase the capacity of the conveyor.

Seeds separated from coarse material at a higher level may be conveyed, preferably by an auger conveyor, to a convenient side region, where it may be allowed to cascade downwards in an evenly distributed stream through an air stream of controllable velocity and direction for the removal of light impurities. All the separated and cleaned seed may then be conveyed, where necessary via a final cleaning apparatus, to a bulk tank preferably provided with transloading facility.

The alternative forms of separating apparatus are provided downstream of the crop stripping apparatus for separating ready threshed and unthreshed seeds and for cleaning the seeds by space-saving compact means arranged and driven to operate transversely across the path of movement of the harvesting apparatus so that material flows from side to side and from an upper to a lower level across all or part of the width of the apparatus.

Although the cleaning part of the preferred form of apparatus has been described in a specific manner, it should be noted that before or after primary separation of seeds threshed by the stripping apparatus the collected material may be allowed to fall to a lower level where a transversely arranged auger or other crop conveyor behind the stripping apparatus transfers it to one side or into the center for rearward feeding by known means into the intake region of a transversely arranged tangential or axial threshing apparatus, as previously described. Optionally the threshing apparatus may be inclined towards the discharge region so that space is available under much of the threshing apparatus for known seed cleaning and conveying apparatus to be provided.

An alternative form of primary cleaning apparatus for stripped seed samples contaminated with coarse unwanted crop fractions may be provided by replacing with a perforated screen or sieve the floor plate of the kind of crop elevator which is commonly used in conventional combine harvesters for feeding the cut material from the cutting table to the threshing mechanism. Cut seed-bearing crops do not contain worthwhile quantities of free seeds, but during in situ stripping, particularly of grain crops, over 90% of the seeds may be threshed by the stripping device.

The screen which may be provided under the crop elevator may have fixed apertures of different shape and size, or it may be an adjustable-aperture sieve. The screen may be kept static, or it may be reciprocated in or across the direction of crop flow or about a pivot positioned in any of a range of locations in or adjacent the screen area. Separated seeds fall on to a collecting ramp, from which they slide into, for example, an auger conveyor or are removed by scraper or other means.

A seed separating conveyor may employ slats, tines, fingers or other discontinuous means for moving stripped crop material over a perforated surface, optionally delivering it to further processing means, which may be oriented parallel with or transversely to the direction of movement over the ground of the harvesting apparatus.

The present invention may be put into effect in such a way that the apparatus can be mounted on a tractor, preferably a tractor with reverse drive facility, or that it may be mounted on a self-propelled vehicle with appropriate controls and optionally provided with final seed cleaning means and a holding tank with emptying conveyors.

Generally the invention finds application in the harvesting of mature seeds by a single pass or successive passes, including cereals, pulses, oil seeds and herbage seeds, and in the harvesting of whole seed bodies, some fruiting bodies and foliage fractions.

Preferred embodiments of the present invention to be described provide, in addition to compactness of construction offering low weight and cost, the advantages of high work rates and hence low harvesting costs, timeliness of harvesting, extended time available to the farmer for preparing for the next crop, and efficient and economical disposal or utilisation of the crop residue, which dries quickly after rain and is favourably presented for burning, chopping or harvesting, as required.

Embodiments of the invention will now be described by way of example with reference to the accompanying drawings, in which;

FIG. 2 is a front elevation of two types of crop combing tooth;

FIG. 3 is a side elevation of one of the crop combing teeth seen in the direction of arrows 3—3 in FIG. 2;

FIG. 4 is a side elevation of another type of crop combing tooth seen in the direction of arrows 4—4 in FIG. 2;

FIG. 4a is a plan view of chamfered, discontinuous guides in which crop engaging elements may be held captive;

FIG. 5 is a front elevation of a variation of one type of crop combing tooth;

FIG. 6 is a side elevation of the variation of a crop combing tooth as seen in the direction of arrows 6—6 in FIG. 5;

FIG. 7 is a front elevation of triangular crop combing teeth with alternating seed loosening beaters;

FIG. 8 is a side elevation of a triangular crop combing tooth and of a seed loosening beater seen in the direction of arrows 8—8 in FIG. 7;

FIGS. 9 and 9a show a side elevation and section respectively of a crop engaging element which combines the functions of seed loosening beaters and crop combing teeth;

FIGS. 10 and 10a show respectively a front elevation of successive, inversely oriented rows of crop combing teeth with asymmetrical base regions and a section in plan view of the development of a crop stripping rotor provided entirely with such crop combing teeth;

FIGS. 11 and 11a show similar views but of successive staggered rows of spaced-apart crop combing teeth having generally the shape of a Gothic arch;

FIG. 11b is a partly sectioned side elevation of one tooth as shown in FIG. 11;

FIGS. 12 and 12a are views similar to those in FIGS. 11 and 11a but of symmetrical triangular teeth with parallel-sided base portions;

FIGS. 13 and 13a are similar views of similar elements to those in FIGS. 12 and 12a, but showing the crop-facing side regions of the base portions adapted to more vigorous crop stripping;

FIG. 14 is a perspective view of a crop combing tooth essentially as shown in FIG. 13;

FIG. 15 is a front elevation of a crop combing tooth with side regions in the two halves adapted differently to vigorous crop stripping;

Figure 19:
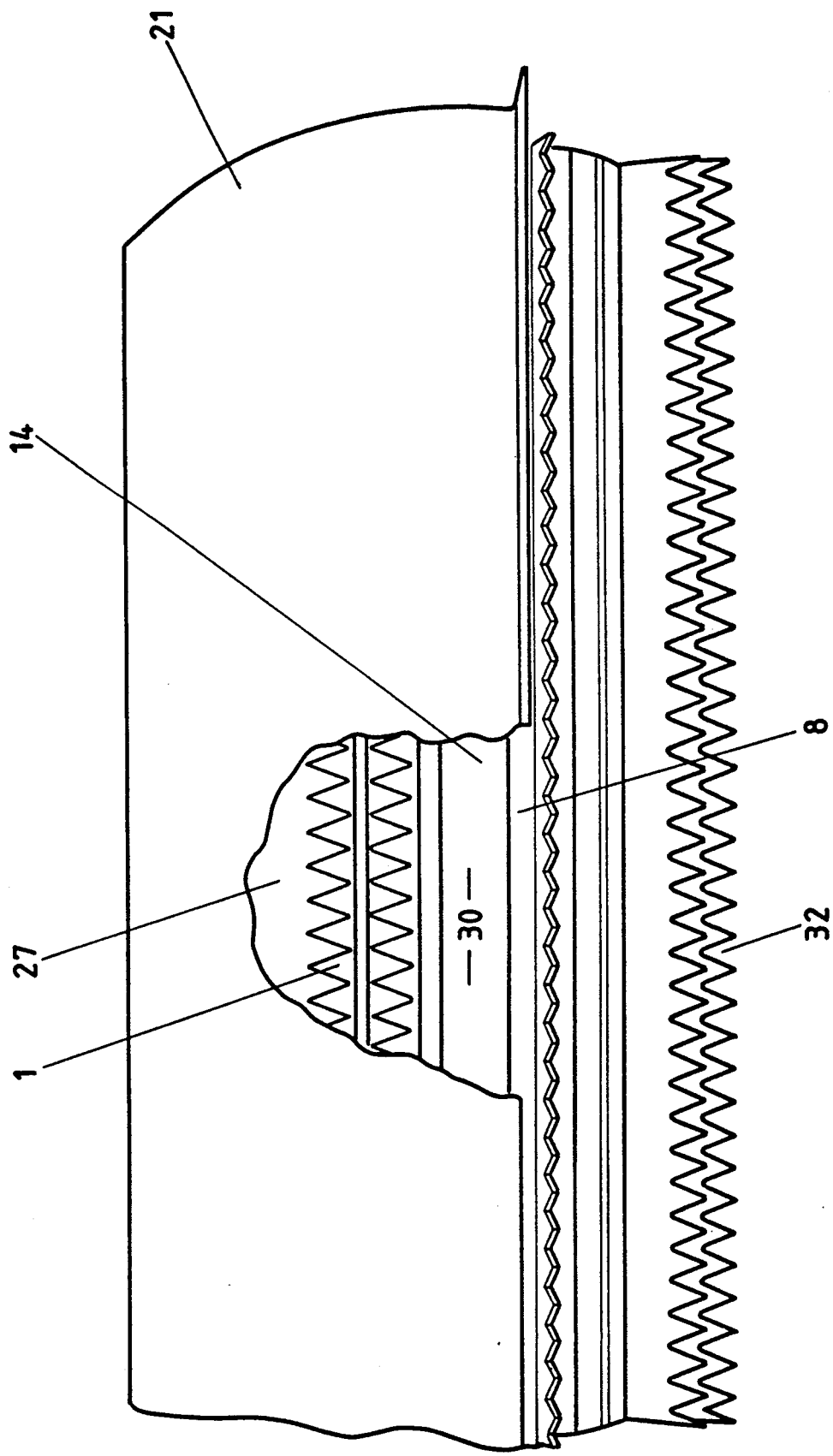
Figure 26:
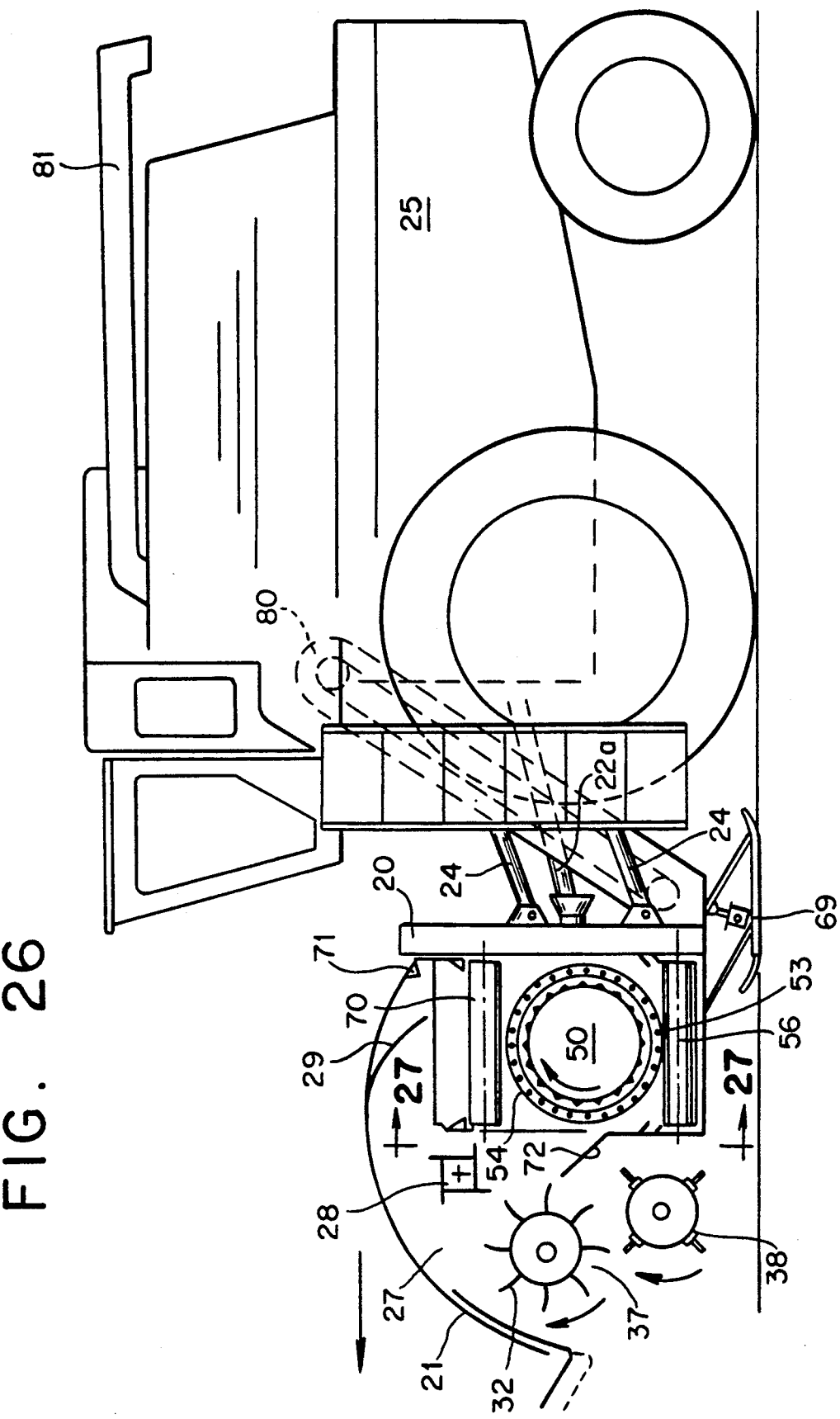
Figure 27:
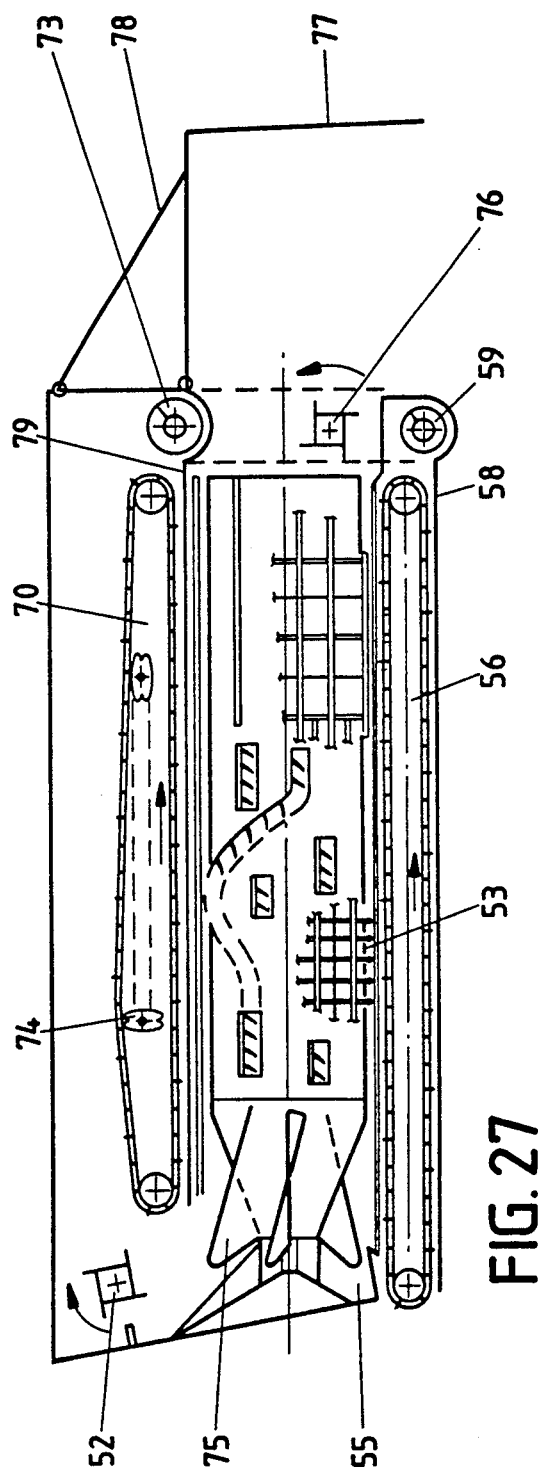
Figure 28:
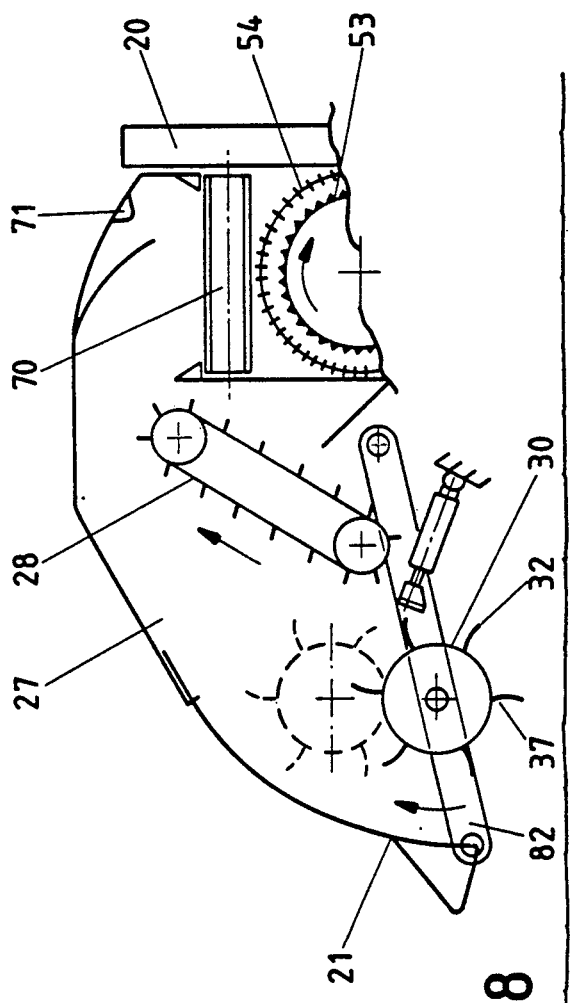

FIGS. 15a and 15b are sectioned side elevations of the element shown in FIG. 15 in the direction of arrows 15a—15a and 15b—15b respectively;

FIG. 16 is a front elevation of crop engaging elements, showing how flexible sections of side regions are deflected by stiff crop stems;

FIG. 17 is a front elevation of alternative elements with flexible side regions, and FIG. 17a is a side elevation, partly in section, of the element in FIG. 17 in the direction of arrows 17a—17a;

FIG. 18 shows an alternative element with flexible side regions which carry protrusions near the edges;

FIG. 18a is a side elevation, partly in section, of the element in FIG. 18, and FIG. 18b is a cross-sectional elevation in the direction of arrows 18b—18b;

FIG. 19 is a perspective view of a crop stripping rotor and of its crop guide cover;

FIG. 20 shows in diagrammatic side elevation, partly in section, a harvesting apparatus embodying the invention, generally in the form of a tractor-mounted device;

FIG. 21 shows in side elevation alternative crop stripping means to those disclosed in FIG. 20;

FIG. 22 shows detail of the crop engaging edge profile of an additional rotor;

FIG. 23 shows cross-sectional detail of the additional rotor;

FIG. 24 shows in cross-sectional diagrammatic form an alternative additional rotor;

FIG. 25 shows mainly in cross-sectional elevation details of seed cleaning apparatus as seen in the direction of arrows 25—25 in FIG. 20;

FIG. 26 shows in diagrammatic side elevation, partly in section, a harvesting apparatus embodying the invention and generally in the form of a self-propelled machine with seed stripping and cleaning apparatus attached at the front;

FIG. 27 is a cross-sectional elevation in the direction of arrows 27—27 in FIG. 26, showing, partly in section, an alternative seed cleaning apparatus;

FIG. 28 is a diagrammatic side elevation, partly in section, of an embodiment of the invention in which an auxiliary crop conveying device bridges the gap between a seed stripping device and a seed cleaning apparatus.

Figure 1:
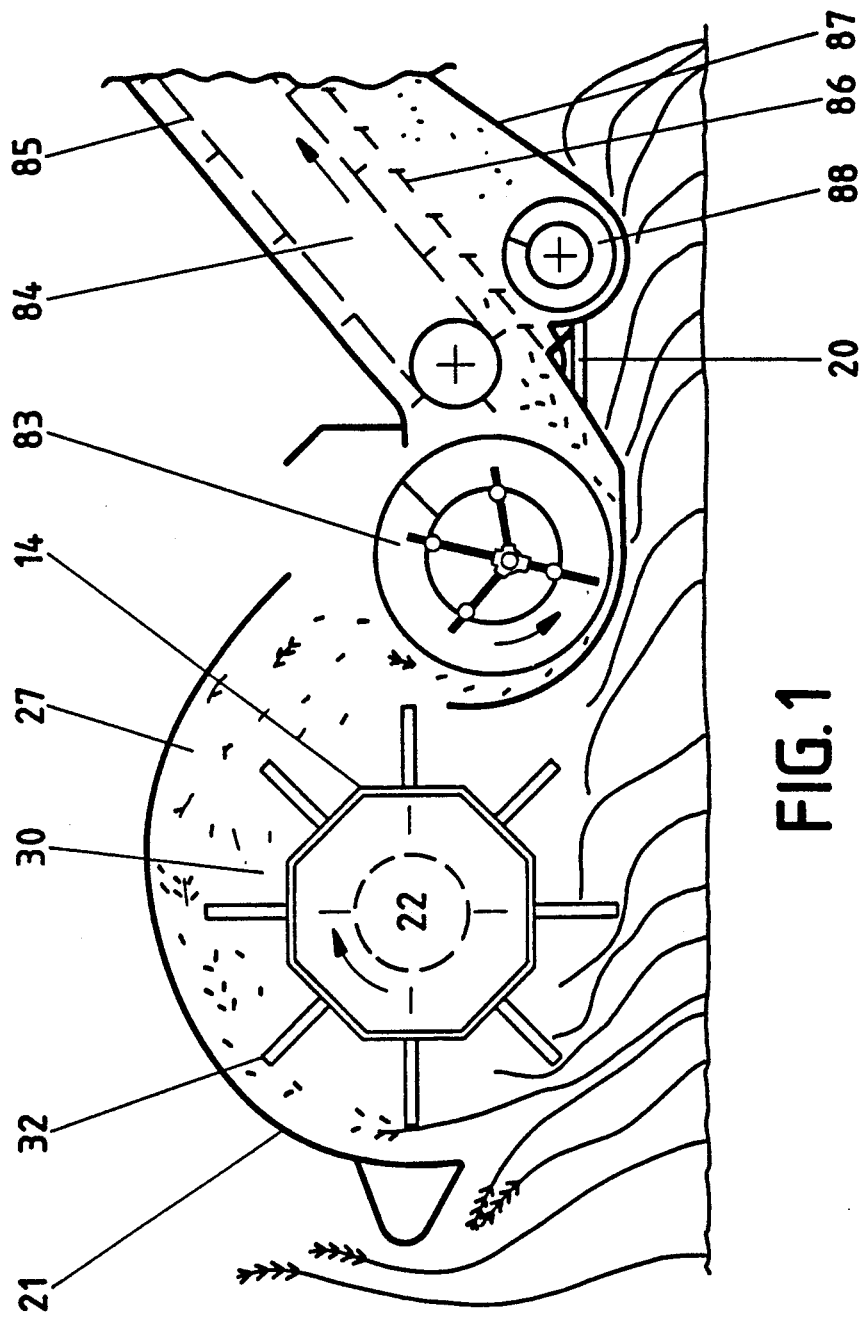
FIG. 1 is a diagrammatic cross-sectional side elevation of a stripper harvester embodying the invention.
Figure 29:
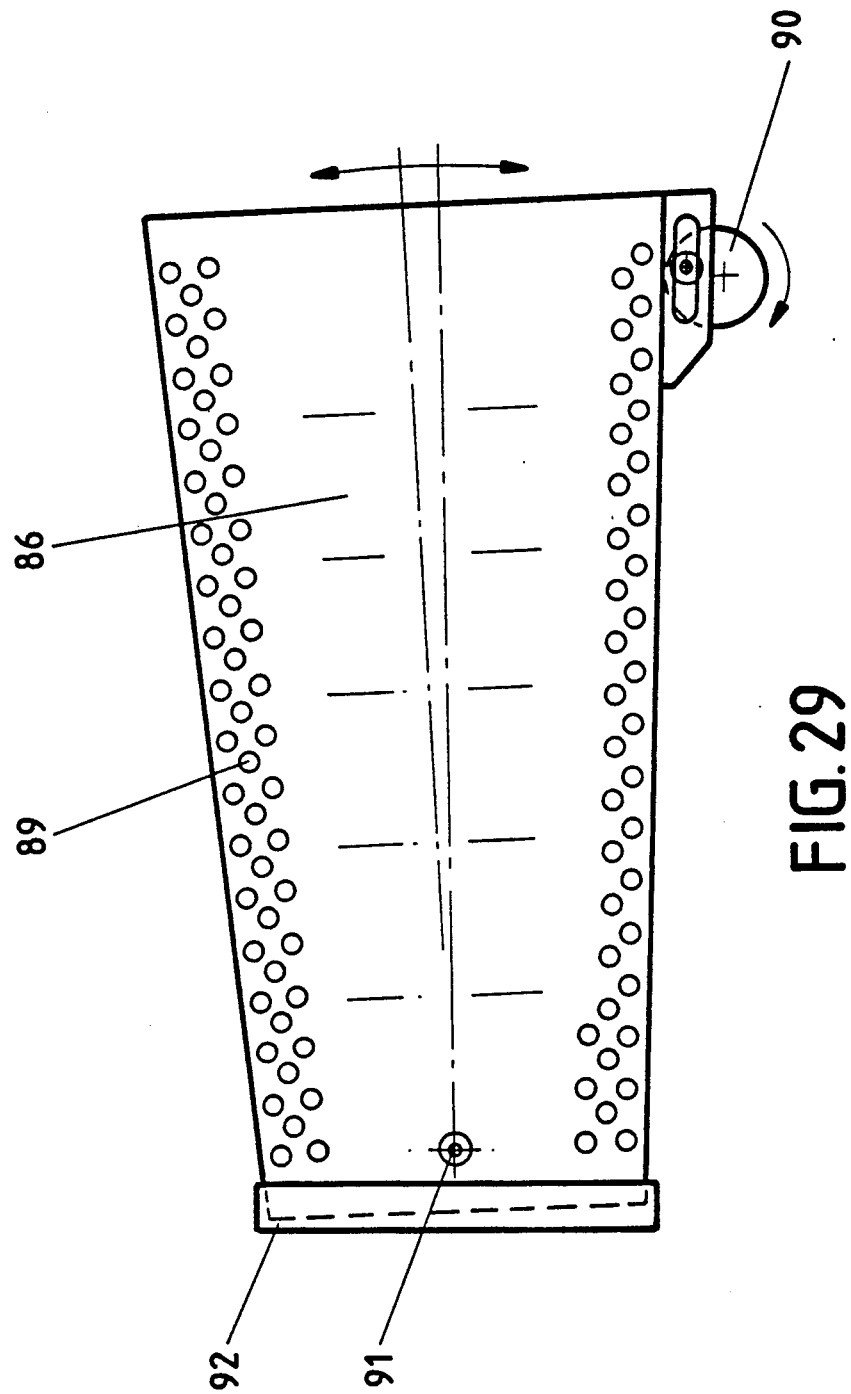

FIG. 29 shows by way of example one form of driven separating screen of a primary seed separator, as disclosed in FIG. 1.

Throughout this specification corresponding components of the various arrangements have been given identical reference numerals. For brevity and simplicity the functions and inter-relationships between the various components are described and explained only when they are first mentioned and not fully in connection with each figure. Thus it is to be appreciated that each time corresponding components with identical reference numerals are referred to, the appropriate description applies.

Referring first to FIG. 1, there is shown in diagrammatic side elevation a generalized layout of one embodiment of the present invention for harvesting crops by stripping off the wanted parts in situ. The apparatus comprises a mobile support structure, or frame, indicated generally at 20, for movement over the ground when pushed or pulled by a tractor, or when attached to a self-propelled power unit.

Connected to frame 20 is a moveable support means 14; in the embodiment shown this is a hollow tube, but other support means may be used, for example an endless belt. Mounted on the support means 14 are a plurality of outwardly projecting crop engaging elements, generally indicated at 32, which may take several different forms, as described hereinbefore or hereafter. In combination the moveable support means 14 and the crop engaging elements 32 form a crop stripping device 30. This is driven by drive means indicated diagrammatically at 22, which may comprise a drive train made up of gears, belts, chains and/or hydraulic means, using power derived conveniently from the engine of the operating unit.

The direction of rotation of crop stripping device 30 is such that the crop engaging elements 32 comb through the crop in the upward direction at the front.

To prevent material detached from the crop by stripping device 30 becoming lost, there is provided a crop guide cover 21; this cover is preferably smoothly curved and extends from in front of the seed stripping region to beyond the rear of stripping device 30. The unobstructed space beneath the cover 21 forms a crop flow passage 27.

In the embodiment shown in FIG. 1 the stripped material is directed into a transverse conveying auger 83 which is located in a trough and has series of retracting fingers over part of its length. The fingers serve to push the collected material into ducting 84 where a slatted chain elevator 85 conveys it to a higher level for further processing or collection.

When seed crops are harvested by stripping with the harvester of FIG. 1, a high percentage of seeds is threshed by the stripping device 30. This free seed may be separated from any coarse crop fraction through a screen 86, which is shown diagramatically to provide the floor of duct 84. A ramp 87 directs the separated seeds into a transverse conveyor 88, conveniently an auger conveyor, for transfer to one side of the apparatus.

In operation the apparatus is moved forward through the crop by its power unit, which may be a tractor or other prime mover. Rotation of the stripping device 30 causes the crop engaging elements 32 to comb upwards through the crop at a front region, orientating and gathering plant stems and other parts. Detachment of wanted plant parts is accomplished at suitable peripheral tip speeds of the elements 32 by beating, bending, rubbing, squeezing, tearing and breaking, at least in part induced by the whiplash and crop guiding effects resulting from appropriate arrangements of the elements 32.

Referring next to the crop engaging elements, which perform the important function of detaching the wanted crop parts, there is shown in FIG. 2 in front elevation part of an elongated member, preferably formed by moulding, which provides a plurality of interconnected crop combing teeth. Tooth form 1 is generally triangular with an optional parallel-sided base region. On its crop engaging surface it may be flat or concave. The parallel-sided base portion may be flat, to provide predictable yielding at that region if an obstruction should be encountered.

Tooth form 1 is shown in FIG. 4 in side elevation. Whilst the tooth may be forwardly inclined, it may also be fashioned or mounted to be normal to its foot section or reclined from it.

Tooth form 2 in FIG. 2 is broadly spoon-shaped. From its tip inwards the tooth broadens, and preferably the effective height of the tooth is less than that of the triangular tooth 1. Both features are important when tooth forms 1 and 2 are used in alternating order, as shown in FIG. 2. In operation the triangular teeth with their slender tip portions divide the crop mass into strips; any seeds dislodged by them and not immediately impelled into sufficiently steep, upwardly directed recovery trajectories are likely to be caught by the following cupped, or spoon-shaped, teeth.

The spoon-shaped tooth 2 is shown in side elevation in FIG. 3. In addition to being cupped rearwardly in the centre region, it may also be curved in relation to a transverse plane normal to the base. FIGS. 2 to 4 also indicate the enlarged tapered foot portion 6 of the combing teeth, which is shaped and dimensioned to give a sliding fit between pairs of outwardly inclined guide strips 8. The guides 8 may be seam welded or spot welded onto the preferably tubular core member of the moveable support means 14, or they may be screwed or bolted on.

To facilitate insertion into the guides 8 and replacement of the crop engaging teeth, the transversely arranged guides may be discontinuous at intervals. A chamfered break in the guide strips 8 is shown in plan view in FIG. 4a.

A third form of crop combing tooth 3 is shown in front elevation in FIG. 5 and in side elevation in FIG. 6. The triangular tip portion of tooth 3 is forwardly inclined in the direction of movement of the tooth, whilst the base portion may be reclined. As shown, the forward inclination of the outer portion amounts to 25°-30° relative to a transverse plane passing from the tip through the transverse axis of the moveable support means.

Optionally the tooth may be cupped either smoothly, like tooth form 2, or by the provision of crimp lines along the outwardly directed center line and perpendicular to this where the tooth shown is widest. Alternatively, the tooth may be curved along its length. Preferably throughout the inner regions the neighbouring side regions of adjacent teeth diverge for at least one-third of the crop engaging length of the teeth.

Thus, triangular seed stripping teeth may have near-parallel sided base portions, the teeth may be flat or cupped and project at an angle or normal to the foot section, and they may be bent or curved along their length.

The enlarged foot section 7 of tooth form 3 is shown to be tapered at the rear and stepped at the front. Corresponding guides 8 and 9 secure the elements to the moveable support means 14.

In FIG. 7 are shown triangular combing teeth 1 alternating with seed loosening beaters 4. In operation the reclined wings or arms 5 of the beaters 4 intrude laterally into the annular spaces provided, where they impact particularly with seed-bearing parts of the crop which are not always reached by the combing teeth. The reclined arms 5 may project laterally at a range of angles, preferably at enclosed angles of not less than 45°.

Whilst the arms 5 of beaters 4 are shown to be either rectangular or circular in cross-section, they may take many forms and dimensions, to give varying degrees of resistance to deflection and, consequently, different crop rubbing effects. The lateral extension of arms 5 may also vary; laterally adjacent but circumferentially displaced beaters may have arms which bridge the transverse gap between them, to form in operation of the apparatus an enclosure between the base and tip regions of the crop engaging elements.

Advantages of the V-form seed loosening beaters 4 include effective protection against damage, good adaptation to varying load conditions, and savings in the quantity and cost of material from which the beaters are made.

In FIG. 8 is shown a side elevation of a triangular combing tooth 1 and a laterally adjacent, reclined seed loosening beater 4 with outwardly inclined arms 5. If the leading base or stem portion of beaters 4 is fashioned to be longer than shown, transversely projecting arms 5 may be inwardly inclined optionally.

The foot sections 6 of crop engaging elements 1 and 4 in FIG. 8 are held captive in guides provided in the form of a moulded slat 10, which is particularly suitable for attachment to resilient moveable support means 15, like belts or other flexible material.

Optionally the foot sections 6 and 7 of crop engaging elements 1 to 4 in FIGS. 1 to 8 may be provided with laterally spaced apart inserts, or a continuous reinforcing strip, made of rigid material, to prevent the foot sections from being forced out of the guides 8, 9 and 10. The inserts may take the shape of convex plates 11, flat plates 12 or concave plates 13.

It should be noted that more conventional means are also suitable for attaching the crop engaging elements of the present invention to moveable support means, for example screws, bolts or rivets.

Reclined seed loosening beaters will normally be required on crop stripping apparatus in smaller numbers than combing teeth, and provision of 1 in 4 to 1 in 8 will be adequate for most purposes. In the direction of movement the seed loosening beaters preferably follow in line with the combing teeth, but they may be secured to the moveable support means 14 and 15 individually in any suitable position between rows of combing teeth.

Whenever in front elevations of transverse arrays of crop engaging elements an element is shown in broken outline, as for example in FIGS. 2 and 7 and also subsequently, such elements are to be taken to be circumferentially displaced on the support means 14 and 15 relative to elements shown in full outline.

FIGS. 9 and 9a show respectively in front and side elevation, partly in section, a curved, triangular seed-loosening head 4, having trailing wings 5, which is combined with a stem section 1 whose crop-facing surface may be flat or concave. It is the purpose of this form of element to move through the crop in any direction with minimal adverse disturbance and to impel detached particles, particularly seeds, into safe recovery trajectories, preventing specifically the forward splashing effect which can occur with some flat elements in some crops. An optional diamond-shaped protruding gusset feature 17, seen in plan view in FIG. 9, and in side elevation in FIG. 9a, strengthens the intersection between the two leading planes and prevents detached particles from residing too long on the element by directing them sideways.

On the moveable support means 14, shown in FIG. 9a, there are provided guides in the form of a slat 10 for the enlarged foot section 7 of the element; the base portion is so shaped that insertion of elements into the guides is possible by lateral sliding or by forcing the specially adapted base portion inwards between the preferably spring-like guides. The shape of the foot section provides a self-locking fit.

FIGS. 10 and 10a show respectively in front elevation and plan view successive rows of asymmetric crop combing elements 3 arranged in continuous transverse arrays, the tip regions of the elements being triangular and the base regions trapezoidal. Alternate rows of crop combing elements 3 have their continuous slanting side facing in opposite directions, and this produces an overlap effect which induces transverse bending of crop in opposite directions in succession. The resultant vigorous shaking of the crop is particularly effective for detaching heavy seeds or selectively stripping mature seeds during successive passes.

FIGS. 11 and 11a show crop combing elements generally of tooth form 2 resembling in outline a Gothic arch. Their advantage stems from the gradually inwardly directed convergence of the sides of the teeth in successive transverse rows, with near-radial inclinations at the base. A particularly favourable aspect of this form of element is that the lateral spacing of the teeth is not critical, the intrusion by crop into the unswept circumferential passages between laterally adjacent rows of teeth being limited automatically by the thickness and stiffness of the plant stems.

The crop combing teeth 2 in FIGS. 11 and 11a are provided with crop facing surfaces which are recessed towards the centre to form sloping peripheral regions. Thus, each element is bounded by a single-bevel ridge which tapers towards the tip and edge regions. The generally cupped shape is shown in side elevation in FIG. 11b. This tooth form has wide applicability to the harvesting of seed crops generally, but particularly to small round seeds which are easily lost normally.

Although the elements 2 in FIG. 11 may be used exclusively on any one stripping device, they may also be interspersed with any of the other forms of crop engaging elements disclosed hereinbefore. Optionally the upstanding ridge around elements 2 may be notched to form surface protrusions 17 and surface recesses 16. A notched or alternatively castellated or otherwise recessed edge profile is particularly effective for stripping wanted plant parts when there is circumferential overlap between base regions in successive transverse rows of laterally spaced-apart crop engaging elements.

Another effective shape of crop combing element, not shown, which may be similarly adapted in its peripheral regions, resembles in outline a bottle with gradually tapering neck.

Preferably in operation of the apparatus, when individual elements are spaced substantially apart in the transverse arrays, the effective lateral tip spacing of crop combing elements of width w at the base should be in the range s=0.7 to 1.6 w. At the narrowest of this range of spacings there is sufficient overlap even for soft stemmed crops to be shaken vigorously. At the wider settings wanted plant parts may be harvested effectively from thick, stiff stemmed crops, if necessary in combination with beater-type elements FIGS. 12 and 12a show crop combing teeth 3 whose parallel-sided base regions are adapted to enhance the stripping effect. The elements 3 have serrations in their base regions, and as a result of the staggered formation in successive transverse rows, as illustrated in FIG. 12a, the stripping of wanted plant parts is achieved by the combined effects of recessed side edges and induced whiplash.

Preferably the lateral spacing of combing teeth 3 is such that in operation of the stripping device the one or more recesses 19 in the base regions of circumferentially spaced but laterally adjacent teeth form enclosures. For serrations of given dimensions the size of the enclosures depends on the spacing of the elements in the transverse rows. The number and circumferential spacing of transverse rows of elements determines the depth to which crops of different growth and stiffness characteristics are able to penetrate the space swept by the elements.

Optionaly the outer portion of the triangular element generally of tooth form 3 shown on the left of FIG. 12 may be more slender, as indicated in chain-dotted outline, and there may then follow in an inward direction a lateral protrusion 18 to shake the crop abruptly. Optionally a similar protrusion on the adjacent side of the laterally adjacent element may be absent.

In FIGS. 13 and 13a the leading elements 1 are provided in the edge regions of the base sections with differently shaped and dimensioned notches 16, affecting only the crop engaging and side surfaces. This form of profiling limited to the boundary regions of crop engaging elements, to increase sliding resistance and crop agitation, may be continued outwards towards the tip of each element.

In FIG. 14 is shown in perspective view a triangular crop combing element 3 having a distal tip region which is forwardly inclined by 25°–30°. Alternatively the element may be of flat tooth form 1. The side regions of the base section are provided with notches 16 of identical or different shapes, as shown by way of example, to enhance the stripping effect by increasing crop sliding resistance and agitation. The notches 16 are present in the crop engaging and side-facing surfaces of the tooth but do not change the front profile of the tooth. The latter is important, especially in fragile crops, to minimise the risk of detachment of unwanted plant parts.

FIG. 15 is a front elevation of a triangular crop combing tooth 1 which has been adapted for illustration only to provide in alternative ways the required high sliding resistance and additional crop agitation. In the left-hand half, shown in FIG. 15a in sectional side elevation in the direction of arrows EE, there are provided at the side of the inner portion of the tooth pronounced protrusions 17, generally of the shape of half sections of cones. Pyramid and other shapes are also effective.

In the right-hand half of the tooth shown in front elevation in FIG. 15 and in cross-sectional side elevation in the direction of arrows FF in FIG. 15b, there are provided on the crop facing surface of the tooth transverse ribs 17 with a rounded upper edge and with optional depressions 16 between them. This succession of protrusions and recesses or depressions also increases sliding resistance and crop agitation. It should be noted that the protruding ribs and the recesses may taper towards a flat centre portion of the tooth and that they may have different cross-sectional shapes. Additionally, instead of their transverse orientation, the elongate protrusions and recesses may be arranged in herringbone or other patterns.

As an alternative or addition to any of the modifications of the inner peripheral regions of crop combing teeth described hereinbefore, there may be provided around the whole or part of the tooth perimeter protrusions at spacings and of dimensions suitable for specific crops and conditions. Optionally there may be provided additional depressions in the cross-sectional tooth profile between such protrusions.

In FIG. 16 is shown a front elevation of crop engaging elements generally of tooth form 1. Instead of being made from resilient plastics material of uniform thickness, there are provided central ribs 100, indicated in broken outline, which are thicker and more rigid than the side regions 102. By their thin construction and/or the type of material from which they are made, the side regions 102 are sufficiently flexible to yield in the direction of rotation of the stripping device when they come into contact with stiff plant parts.

Preferably the side regions 102 are provided with spaced slits 101, to make possible yielding of individual sections independently. Preferably the slits 101 are confined to the wide base region of the elements and extend laterally up to the center rib 100 perpendicular to the longitudinal centre line of the element. To prevent tearing or fatigue due to repeated bending, it is preferred that the slits 101 terminate in small holes 103.

The type of crop combing tooth shown in FIG. 16 is equally suitable for the stripping of seed and foliage crops, and it ensures that the forward facing plant parts, particularly of stiff stemmed crops, are effectively removed. It should be noted that the central rib sections of the elements in FIG. 16 may be tapered in the outward and inward directions over the whole or part of their length and may be bevelled or rectangular in cross-section on the trailing surface of the elements.

The side regions 102 may be of uniform thickness, or they may reduce in thickness from the edges towards the center ribs, or vice versa. During manufacture the side regions 102 may be given a directional spring bias, for example by appropriate moulding techniques or lateral curving, to counteract at least in part the centifugal effect, so that the side regions are more easily deflected into reclined positions by the crop. The slits 101 may extend laterally at angles other than normal to the longitudinal centre line of the elements.

For some crops the crop engaging elements generally of tooth form 1 may be made entirely of thin, flexible material, optionally with the side regions separated from the mounting region by transversely extending slits and optionally subdivided by additional slits spaced apart in the outward direction. Such elements are well suited to enveloping crop stems from the sides to achieve a high degree of effectiveness in the removal of wanted plant parts. They rely for their effectiveness on the flailing effect they produce and are particularly well protected against impact damage.

In FIGS. 17 and 17a are shown respectively in front elevation and in partly sectional side elevation in the direction of arrows GG crop engaging elements generally of tooth form 3. They differ from the elements shown in FIG. 16 in the shape of their base regions. Additionally the flexible side region on each side of each tooth is divided by only one slit spaced in the outward direction from the base region, so that the inner and outer flaps thus formed may fold back in response to crop pressure and friction, to envelope plant stems momentarily from the side.

FIGS. 18 and 18a are similar views of a variation of the elements shown in FIGS. 17 and 17a. The flexible side regions 102 are provided near the edges with protrusions 17, shown to be half sections of cones, but which may take different forms. When in operation of the apparatus crop pressure and friction increase due to increasing crop bulk being gathered between adjacent combing teeth, the flexible side regions 102 becomes deflected rearwardly, and this causes the protrusions 17 to pivot laterally and extend into the adjacent spaces not otherwise swept by crop engaging elements. In consequence the treatment of the crop becomes more severe, and forward facing wanted plant parts are detached more effectively.

FIG. 18b is a view in the direction of arrows HH in FIG. 18, showing in broken outline the effect of deflection of the side region on the new position of protrusion 17.

Whilst all the elements with flexible side regions in FIGS. 16 to 18 are shown to be closely adjacent to each other laterally, they may have other lateral tip spacings, including twice that shown. The elements are provided in their mounting region with attachment holes for screwing, bolting or rivetting them for example to upstanding flanges.

FIG. 19 is a perspective view of a rotary crop stripping device 30 and crop guide cover 21 which is cut away in part to reveal the upper arrays of simple crop combing teeth 1, generally as shown in FIGS. 2 and 4. The cut-away also reveals more clearly the moveable support means 14, the sliding guides 8 for the elements, and the crop flow passage 27, defined by rotor 30 and crop guide cover 21. Material stripped off the crop is propelled by rotor 30 along the crop flow passage 27 into simple collecting means or into apparatus for separating the wanted from the unwanted material and optionally cleaning the wanted material.

It should be noted that the stripping device may consist optionally of two rotors, one above the other and co-rotating, or two at similar levels and counter-rotating. Alternatively the stripping device may consist of a full-width belt with crop engaging elements attached to it and supported by two rollers, at least one of them driven.

FIG. 20 is a diagrammatic side elevation, partly in section, of a harvesting apparatus embodying the invention, generally in the form of a tractor-mounted device. In the front region there is shown to be provided a seed stripping apparatus 30 comprising moveable support means 15 which may consist of an endless impervious belt, flexible sheet or canvas 33 supported by rollers 35 and 36 and carrying, generally indicated as 32, crop combing teeth and optional seed loosening beaters.

It is preferable that the upper roller 36 is driven and that it is positioned vertically above or forward of lower roller 35. This arrangement has the advantage that in normal field crop conditions the seed-bearing heads are engaged before the bottom of the stems by the stripping elements 32, and thus shedding losses often caused by vibration of the stems are minimised. A further advantage particularly of the forwardly inclined stripping device 30 is that the friction forces applied to the plants are low.

Conveniently there may be provided on the driven underside of flexible support means 33 teeth or toothed belts, at least near the sides, to register with toothed wheels or pulleys on at least one of the supporting rollers which provides the drive.

In FIG. 21 is shown in diagrammatic side elevation an alternative crop stripping arrangement to that disclosed in FIG. 20. It comprises an upper, preferably tubular, moveable support means 14 forming with crop engaging elements 32 a stripping rotor, generally indicated at 37. A second rotor 38 beneath and to the rear of rotor 37 comprises a tubular support means 30 which has attached to it crop combing teeth or plain tines for lifting or recovering seed-bearing plant parts from the lower crop regions and presenting them to the upper primary rotor 37.

Returning to FIG. 20, there is shown in front of the upper part of the seed stripping device 30 an additional rotor 39 which is shielded around most of its front portion by a hood 40 against premature contact with the crop. Transverse paddles or ribs 41 on the rotor 39 have outer edge portions which are bent forward in the direction of rotation and are scalloped, as shown in detail in FIGS. 22 and 23. Purpose of the forwardly inclined scalloped edges is to dislodge seeds from the forward facing regions of seed heads, to assist in the feeding of crop into the principal stripping device 30, especially when the crop is unfavorably oriented, and to divert into upwardly directed recovery trajectories seeds which are propelled against it by the principal stripping device 30.

To prevent loss of seed by ricochetting off the additional rotor 39, the front faces of the transverse ribs 41 and core sections between ribs may be covered with soft but durable material 42, as shown in FIG. 22.

Additional rotor 39 may be adjustable vertically and horizontally relative to the primary seed stripping device 30.

An alternative form of additional rotor 39 is shown in FIG. 24. The preferably tubular core member 44 is densely populated on its surface with tough but readily yielding protrusions 45 which may taper towards their tips and may be circular or oblong in cross-section. This rotor 39 serves to remove seeds from the forward facing parts of seed stems by a flailing action and to arrest any seeds propelled against it and re-direct them for recovery.

Returning again to FIG. 20, the material removed from the crop by the stripping device 30 and, when fitted, additional rotor 39 is propelled upwards and is prevented from being lost by an upper crop guide cover 21, which is preferably smoothly curved and extends from in front of the seed stripping region rearwards over the whole apparatus.

On reaching the crop flow passage 27, the crop parts are directed towards the separating apparatus. To assist the passage of material and, if necessary, induce directional changes or prevent crop accumulations, auxiliary crop conveying means may be provided, where required.

The conventional rotor 28 shown between the seed stripping device 30 and the separating apparatus may be positioned higher or lower, be driven in either direction and may take the alternative forms of a plain or profiled roller or of a short continuous belt conveyor. Auxiliary crop conveying means may be provided also for example in place of the optional additional seed stripping rotor 39, or, with rotor 39 in position, then immediately above it.

As a first step towards the separation of seeds and other small fractions from the coarse material detached by the seed stripping means, there may be optionally provided spaced-apart static fins 46 to divide off the rear part of the crop flow passage between the crop guide cover 21 and a transverse auger conveyor 48. Above this conveyor and behind the coarse crop deflecting fins 46 is positioned a driven shaft carrying thin discs 47 so spaced that they divide equally the spaces between the fins 46.

Preferably the discs are provided on their peripheries with occasional recesses to enhance their conveying capacity.

The combination of spaced fins 46 and downwardly rotating discs 47 facing the crop stream results in efficient separation from coarse material of small particles, without blockages occurring, even in the presence of large quantities of crop bulk. Separated small fractions which have passed between the fins 46 and discs 47 are collected in the trough beneath the auger 48 and are conveyed sideways for subsequent cleaning and combining with other seed separated later.

The coarse material, which usually contains some seed heads requiring further threshing, next enters the main part of the transversely arranged and driven separating apparatus indicated generally at 50.

At the uppermost level there may be provided optionally a transverse belt conveyor 51 which feeds the material to one side of the apparatus. Details of the main separating apparatus 50 are shown in greater detail in FIG. 25 which is a cross-sectional view generally in the direction of arrows JJ in FIG. 20.

In FIG. 25 the belt conveyor 51, which may be cleated, is shown to move the material to be threshed from right to left towards the feed end of a multiple-drum threshing apparatus 53 beneath. A feed beater 52 force-feeds the coarse material downwards in front of the first threshing drum of the threshing apparatus 53, for it to be drawn under the first and subsequent, co-rotating drums for threshing in co-operation with an open-grate concave 54 of generally known form beneath each drum.

To the left and forward of the first drum of the threshing apparatus 50 there is provided a recessed stone trap 55 into which fall, or are propelled by the beaters of the first drum, heavy objects which may have been entrained in the crop stream. The drums of the threshing apparatus 50 may take different forms. They may have mounted across their width conventional rasp-type threshing bars, or more aggressive studs or pegs, or less aggressive plain or profiled ribs.

Although five successive threshing drums are shown, followed by a stripper beater in the exit region of the threshing apparatus 50, there may be needed for some crops and conditions fewer drums and concaves, the minimum being one threshing drum and one stripper beater.

As shown, the open-grate concaves 54 are individually and adjustably pivoted at their entrance regions and are preferably supported on resilient springs under the exit region. Alternatively, the concaves may be mounted in a common frame structure provided with height adjusting means, at least at the corners, to vary the clearance above and hence the severity of the threshing process.

Beneath the open-grate concaves 54 of the threshing apparatus 50 may be provided an open-mesh conveyor 56 having a multiplicity of apertures so dimensioned that seeds are able to pass through readily, but coarse material is retained on top.

To enhance the separating effect of conveyor 56, there may be provided under the upper portion of the conveyor a series of driven or freely rotating agitators 57, causing the upper run of the conveyor to rise and fall abruptly at intervals of time.

As indicated by the direction arrow over the separating conveyor 56 in FIG. 25, coarse material is conveyed to the right to be deposited on the ground. If fewer than a full-width arrangement of threshing drums and concaves are provided, the upper run of separating conveyor 56 is capable of transporting away the threshed material.

Seeds which fall through the upper run of conveyor 56 also pass through the lower run and are conveyed to the left by transverse slats or ribs acting as scrapers on the solid floor 58. The seeds are transferred into a rearwardly moving conveyor 59, preferably an auger conveyor. Optionally there may be provided at either end or both ends of conveyor 56 a counter-rotating brush or other effective device (not shown) for cleaning the conveyor off any material which may tend to adhere to it.

If the belt conveyor 51 is omitted, the coarse material falls immediately onto the co-rotating drums of the threshing apparatus 50, which will convey it towards the feeder beater 52.

The seed with impurities collected in the auger conveyor 42 is also moved to the left towards a space 60, where it may be spread by a suitably shaped scatter plate 61, so that it falls through the space loosely distributed. Air entering through louvres 64 and blown by a fan 62 through an outlet 63 with adjustable baffle and directional flow control may be directed through the falling seed stream, to remove light unwanted fractions which are directed on to the ground by deflector 65 alongside the tractor 26.

The thus winnowed seed falls into the rear section of lower auger conveyor 59 from where it may be elevated, as shown in FIG. 20, by a conveyor 66 into a trailer 67 which may have self-unloading facility and may be pulled behind the tractor 26.

Referring now to FIG. 26, which is a view, partly in section, of an alternative embodiment of the invention, there is provided a seed stripping and separating apparatus mounted in a mobile supporting structure 20 and attached through linkage arms 24 to a self-propelled vehicle 25. The input drive 22a connects the apparatus and the power unit of vehicle 25 in the conventional manner through universal couplings.

On the ground the apparatus is supported on skids 69 which are height-adjustable by a turnbuckle arrangement. At the front of the apparatus there is provided a seed stripping device essentially as shown in FIG. 22, comprising rotors 37 and 38. The crop guide cover 21 has a moveable front section which may be adjusted for height, preferably by remote operator control.

In crops of different length it is important that the front extension of the crop guide cover 21 can be kept at least lightly in contact with the top of the crop, to minimise seed losses by forward projection.

The optional auxiliary crop conveying rotor 28 assists in the transfer of the stripped material to the separating apparatus downstream. An optional transverse array of spaced-apart curved rods 29 directs the coarse crop material on to the forward section of a transverse open-mesh seed separating conveyor 70, whilst the seed and other small fractions are distributed by a splash bar 71 placed into the path of the material over the rearward section of seed separating conveyor 70.

Beneath conveyor 70 may be provided an axial-rotor type threshing and separating device, generally indicated at 50. The axial threshing rotor 53 is surrounded by a cylindrical concave 54, both these components being of known form. In the axial threshing apparatus the crop passes through in a helical path, due to the presence of guides and appropriately curved beater bars, threshing taking place in the upstream section and final separation in the adjacent downstream section. Seeds and other small crop particles which pass through the cylindrical concave fall on to the open-mesh conveyor 56.

Optionally the seed which leaves the stripping rotor 37 belatedly may be collected by the steeply inclined plate 72 to be channelled on to the separating conveyor 56.

More detail of the separating apparatus is given in FIG. 27, which is a view, partly in section, on arrows KK in FIG. 26. The upper open-mesh seed separating conveyor 70 moves the coarse material at the upper level towards the feeder beater 52, whilst the lower run of the conveyor 70 pushes the separated seed in front of the transverse slats on upper scraper floor 79 into the rearwardly conveying auger 73.

Under the upper level of seed separating conveyor 70 are positioned at least two shafts carrying eccentric agitating sprockets 74 which may be driven or allowed to idle but are joined by a chain and equal-sized sprockets to maintain the synchronization which causes the upstream and the downstream portions of the upper conveyor level to be lifted abruptly in turn.

The feeder beater 52 forces the coarse crop material downwards into the intake section of the axial rotor, more particularly into the path of the crop scooping wings 75. A stone trap 55 is provided at the lower forward end of the feed chamber.

On leaving the axial threshing apparatus the material may be spread by an impeller 76 or may be formed into a windrow alongside the apparatus by propelling it against a weighted flap 77 suspended from a folding and extending support frame 78.

Seed which passes through the cylindrical concave 53 may be divided into coarse and seed fractions by the lower separating conveyor 56. The coarse fraction is returned to the ground on the left side of the apparatus, and the seed fraction is scraped into the rearwardly conveying lower auger 59 on floor plate 58.

To the rear of the separating apparatus the seed streams from auger conveyors 73 and 59 are combined to be transferred by elevator 80, shown in FIG. 26, for final cleaning by conventional means on the vehicle 25 and for subsequent temporary storage in a holding tank, provided with a pivotable transloading auger 81.

Referring now to FIG. 28, there is shown in side elevation, partly in section, a height-adjustable stripping rotor 37 with crop engaging elements 32 mounted on moveable support means 30. The rotor 37 and the extendible front section of the crop guide cover 21 are mounted for convenience on the same pivoted arms 82 which may be raised and lowered by the operator by remote control. Regardless of the height setting of the stripping rotor 37, the fixed-position auxiliary crop conveying belt 28 ensures that all detached material is delivered on to the upper level of the separating apparatus downstream.

FIG. 29 is a plan view showing by way of example one form of driven separating screen for a primary separator of individual seeds threshed by the action of stripping device 30, generally as disclosed in FIG. 1. A screen 86 is provided over the whole of its surface area with apertures 89 which allow mainly seeds and not coarse material to pass through. At the lower feed-on end the screen has a pivot 91 and is covered on its upper surface by a short flexible flap 92 attached to the lower base plate of elevator duct 84.

The screen 86 is trapezoidal, being widest at the upper delivery end. An eccentric drive mechanism 90 of known form engages via a roller-type pin with a slot in a short lateral extension of the screen. In operation the eccentric drive 90 causes the delivery end of the screen to reciprocate in an arcuate path about pivot 91.

Material fed on to the inclined screen 86 by slatted chain conveyor 85 has threshed seeds concentrated in the lower stratum of the crop layer, so that many seeds pass through the apertures close to the feed-on region. The lateral movement of the screen increases towards the delivery end, and this increases crop agitation, so that any remaining free seeds are dislodged from the mat of coarse material and become separated.

The apertures 89 may be of fixed size and shape; alternatively the screen 86 may be a sieve with adjustable apertures, for example a frog-mouth or laminar-type sieve. Pivot 91 may be positioned in a range of locations in or adjacent the screen area. As an alternative to the pivotal motion, the screen may be reciprocated in or across the direction of crop flow, or it may be kept static.

An advantage of a screen which is static or reciprocated in the direction of crop flow is that the screen may be transversely dished to be concave on its upper crop facing surface, so that the crop moving means on the conveyor above, such as slats, ribs, tines, fingers or other discontinuous means, may be of unequal length and arranged to form a transverse tip profile which is shaped to be convex. In this way the difference between the density of seed and other crop matter causes the seeds to migrate by gravity into the central region of the screen, where the population density and shape of the crop moving means may be so arranged that a high degree of agitation, and consequently separation, is achieved.

It should be appreciated that the harvesting apparatus described in the foregoing may be used with all or any of the transversely arranged and driven separating components, depending on the degree of separation it is required to achieve. In some instances as clean a seed sample as possible may be demanded, whilst in others only the coarsest non-seed fraction is to be removed.

It should be noted also that the seed stripping apparatus may be used without provision for additional cleaning, for example when all the detached material may be needed for grinding up as a livestock feed. In that event any of the different known forms of crop collecting device may be combined with the seed stripping part of the apparatus.

There will now be considered the important dimensions and general arrangements which are appropriate for the effective operation of the embodiments of the invention. The requirements of different seed crops may vary appreciably, depending on seed size, stem thickness, crop maturity and growth habit.

For dwarf crops having low seed or fruiting bodies the minimum ground clearance under the tip envelope of the seed stripping device may be 25 mm, and the tip radius is preferably not greater than 125 mm. A small tip radius is most readily provided by the vertical or forwardly inclined continuous-belt type stripping apparatus, but in short crops seed stripping rotors of small diameters also perform satisfactorily without wrapping.

The longer the crop stems are, the larger the tip radius of a rotary seed stripping device needs to be. In this respect the forwardly inclined continuous-belt type stripping means has also advantages over rotary stripping means, and the uprooting force it exerts on the crop stems is small.

For the most commonly grown crops, particularly cereal and pulse crops, the effective length of the crop combing teeth, to the bottom of the recesses between adjacent rows of teeth, is preferably 60-120 mm, most preferably 75-90 mm. At the narrowest point between adjacent teeth having parallel-sided base regions the lateral clearance is preferably 10-25 mm, most preferably 15-20 mm. At such lateral clearances some thick-stemmed crops, notably oilseed rape, can be effectively harvested.

The effective length of the spoon-shaped seed combing teeth, when mixed with triangular teeth, preferably at the ratio of 1:1, should be the shorter, preferably by 10-20%, but the lateral spacing should be identical.

Conveniently the seed loosening beaters are evenly distributed amongst the crop combing teeth, and normally but not exclusively they should number approximately 1 in 4 to 1 in 8.

Preferably the transverse spacing of all crop engaging elements is identical and they are mounted circumferentially aligned. In certain conditions it may be advantageous to offset successive transverse rows of elements marginally, so that the element tips form perceptible helices.

Conveniently the lateral pitch of the tips of circumferentially adjacent elements may be 30-100 mm, preferably 45-80 mm and most preferably 60 mm.

Conveniently the maximum radius of seed stripping rotors for the majority of crops in temperate climates may be around 500 mm, and the maximum effective length of a continuous belt-type seed stripping device may be 1200 mm.

Conveniently the radius of the optional additional seed stripping rotors 39 and 43 may vary between approximately 150 and 200 mm.

Conveniently the effective radius of threshing drums used in transversely arranged multiples may vary according to the principal crops to be harvested between 180 and 250 mm, and the radius of an axial threshing rotor may vary between 225 and 350 mm.

In conformity with established practice and the requirements for different crops, the peripheral speeds of threshing and beating drums and of axial threshing rotors may vary widely according to crop type and seed size and maturity.

Conveniently the fore-and-aft length of each threshing and beating drum may be 1000-2000 mm, preferably 1400 mm, and the transverse length of an axial threshing apparatus may be 2000-5000 mm.

Conveniently the fore-and-aft width of transversely arranged conveyors for conveying and separating crop material in association with a threshing device may be identical with the fore-and-aft dimension of the threshing device, or it may be greater above the threshing apparatus and/or less beneath it.

Conveniently the tip speeds of the longest crop engaging element on a seed stripping rotor or belt may vary between 8 and 33 m/s, preferably 12-24 m/s, and most preferably 14-21 m/s.

Preferably the base portion of crop engaging elements may be reclined relative to the direction of rotation, to minimise, in combination with the smooth outline of the teeth, the effect of tearing unwanted crop parts off the plants.

I claim:

1. Apparatus for harvesting a crop comprising:
    a mobile support structure for movement over the ground;
    movable support means capable of being driven relative to the support structure and extending transversely across the direction of forward movement of the apparatus;
    transverse arrays of crop engaging elements, each extending in operation outwardly from the movable support means;
    means for driving the movable support means so that the crop engaging elements enter and comb through the naturally disposed uncut crop at a front region, to detach wanted plant parts from the crop and to impel them into safe recovery trajectories;
    a crop guide cover extending over the apparatus to prevent detached crop particles from becoming lost and to direct them rearward into a collection facility; and
    at least some of the crop engaging elements each has a distal tip for dividing the naturally disposed uncut crop and a transverse crop engaging surface including an inner surface region closer to said movable support means and an outer surface region further from said movable support means and extending to said distal tip and wherein said outer surface region is inclined relative to said inner surface region as viewed in section in a plane through the element from said distal tip to said movable support means and which plane extends in the direction of movement of the element consequent upon said driving of said movable support means, such that the outer surface region leads the inner surface region in said direction of movement of the element, in order to retard outward movement of detached plant parts and to direct such parts into recovery trajectories which are foreshortened in the forward direction, relative to trajectories which result from the outwardly straight planar elements.

2. Apparatus according to claim 1, in which the side regions of laterally adjacent crop engaging elements converge towards one another throughout the outwardly extending length of the elements at closing angles which differ between the outer and inner side regions.

3. Apparatus according to claim 2, in which the side regions of laterally adjacent crop engaging elements converge towards one another asymmetrically in the inner region.

4. Apparatus according to claim 3, in which the outer regions of the elements are circumferentially aligned and the asymmetrical inner regions are oppositely oriented circumferentially in succession.

5. Apparatus according to claim 1, in which the neighboring side regions of laterally adjacent crop stripping elements converge inwardly towards one another in the outer region and then change abruptly to diverge gradually from one another linearly throughout the inner region at least over one-third of the outwardly extending length of the elements, to form large trapezoi- 6. Apparatus according to claim 1, in which crop engaging elements comprise each a broad, outwardly extending stem portion, which may be flat or concave across its width, the stem supporting a distinct, forwardly inclined head portion in the shape of an arrow head, the head portion merging inwards of its tip region with the distal end of the stem portion and lying in a different plane or planes than the stem portion.

7. Apparatus according to claim 1, in which the leading edge regions of crop engaging elements are provided with laterally slanted recesses formed only in the leading surface and in the side faces of each element, without penetrating through to the trailing surface, and are provided with forwardly extending protrusions, to increase crop/element friction.

8. Apparatus according to claim 7, in which the recesses and protrusions extend over most or all of the width of each element on its leading surface.

9. Apparatus according to claim 1, in which one or both of the inwardly diverging side regions of crop engaging elements are provided with one or more lateral protrusions.

10. Apparatus according to claim 1, in which circumferentially aligned crop stripping elements have each at least one recess extending into the side of a rectangular base region, so that in operation of the apparatus the recesses of laterally adjacent but circumferentially spaced elements form between them closed apertures into which the crop can enter only be lateral bending.

11. Apparatus according to claim 1, in which crop engaging elements are made of abrasion and impact resistant material which is so flexible that only in operation of the apparatus are the elements maintained fully in their operative positions.

12. Apparatus according to claim 1, in which the said moveable support means comprises a high-speed, transverse, endless and impervious belt from which the crop engaging elements extend outwardly in operation and the front region of which is forwardly inclined.

13. Apparatus according to claim 1, in which there is provided in front of the principal crop stripping means a partly shielded first rotor driven at sufficiently high speed to strip seeds off the forward facing seed heads, the direction of rotation, in the lower region of the first rotor, and of the impelled detached crop parts being towards the principal stripping means.

14. Apparatus in accordance with claim 13, in which the first rotor has a core member densely populated with flexible elongate projections to strip seeds by a flailing effect.

15. Apparatus for harvesting a crop comprising:
a mobile support structure for movement over the ground;
movable support means capable of being driven relative to the support structure and extending transversely across the direction of forward movement of the apparatus;
transverse arrays of crop engaging elements, each extending in operation outwardly from the movable support means;
means for driving the movable support means so that the crop engaging elements enter and comb through the naturally disposed uncut crop at a front region, to detach wanted plant parts from the crop and to impel them into safe recovery trajectories;
a crop guide cover extending over the apparatus to prevent detached crop particles from becoming lost and to direct them rearward into a collection facility; and
at least some of the crop engaging elements each has a distal tip for dividing the naturally disposed uncut crop, a spine region extending outwardly to said tip and side regions extending laterally from said spine region, said side regions being capable of yielding more readily than the spine region whereby, in operation, such side regions may yield when they come into contact with stiff plant parts.

16. Apparatus according to claim 15, in which crop engaging elements have differing stiffness across their effective width and along their length, so that in operation predetermined flexible regions can yield into reclined positions in response to increasing crop pressure and friction.

17. Apparatus according to claim 16, in which flexible side regions are divided from the mounting region, or are subdivided into a series of flaps, by transverse slits, so that stiff plant stems can be enveloped from the sides by the side regions of the elements for efficient stripping.

18. Apparatus according to claim 16, in which there are provided on the crop facing side regions of crop stripping elements forwardly directed protrusions so dimensioned and positioned that, when through crop contact a wing portion becomes reclined, the deflected protrusions extend into the adjacent annular crop passages not otherwise swept by crop engaging elements.

* * * * *